US011519158B2

(12) United States Patent
Morimoto et al.

(10) Patent No.: US 11,519,158 B2
(45) Date of Patent: Dec. 6, 2022

(54) SHOVEL

(71) Applicant: SUMITOMO(S.H.I.) CONSTRUCTION MACHINERY CO., LTD., Tokyo (JP)

(72) Inventors: Takaaki Morimoto, Chiba (JP); Yuho Nishimagi, Chiba (JP); Takeya Izumikawa, Chiba (JP)

(73) Assignee: SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 639 days.

(21) Appl. No.: 16/536,817

(22) Filed: Aug. 9, 2019

(65) Prior Publication Data
US 2019/0360178 A1    Nov. 28, 2019

Related U.S. Application Data

(63) Continuation of application No. PCT/JP2018/008654, filed on Mar. 6, 2018.

(30) Foreign Application Priority Data

Mar. 7, 2017    (JP) .............................. JP2017-043247
Dec. 27, 2017   (JP) .............................. JP2017-252215

(51) Int. Cl.
*E02F 9/26*       (2006.01)
*B60K 35/00*      (2006.01)
(Continued)

(52) U.S. Cl.
CPC .............. *E02F 9/264* (2013.01); *B60K 35/00* (2013.01); *E02F 3/32* (2013.01); *E02F 9/20* (2013.01);
(Continued)

(58) Field of Classification Search
CPC .. G05G 1/01; G05G 1/02; G05G 1/04; G05G 2009/04774; E02F 3/32; E02F 9/20;
(Continued)

(56) References Cited

U.S. PATENT DOCUMENTS 5,854,988 A *  12/1998  Davidson .................. E02F 9/26
                                                      701/50
6,343,237 B1 *  1/2002  Rossow ............. G05B 23/0267
                                                      700/83
(Continued)

FOREIGN PATENT DOCUMENTS

EP          2551141          1/2013
JP          2016-084663      5/2016
(Continued)

OTHER PUBLICATIONS

International Search Report for PCT/JP2018/008654 dated May 29, 2018.

*Primary Examiner* — Tyler J Lee
(74) *Attorney, Agent, or Firm* — IPUSA, PLLC

(57) ABSTRACT

A shovel according to an embodiment of the present invention includes a lower traveling body, an upper turning body rotatably mounted on the lower traveling body, an operator's compartment provided to the upper turning body, a display device provided in the operator's compartment, and an input device provided in the operator's compartment. The display device is capable of displaying a setting screen for a construction support system using information and communication technology, and a function to switch a screen displayed on the display device to the setting screen is assigned to the input device.

17 Claims, 17 Drawing Sheets

(51) Int. Cl.
*E02F 3/32* (2006.01)
*E02F 9/20* (2006.01)
*G05G 1/01* (2008.04)
*G05G 1/04* (2006.01)
*G05G 1/02* (2006.01)

(52) U.S. Cl.
CPC ............. *E02F 9/26* (2013.01); *G05G 1/01* (2013.01); *G05G 1/02* (2013.01); *G05G 1/04* (2013.01); *B60K 2370/12* (2019.05); *B60K 2370/128* (2019.05); *B60K 2370/151* (2019.05)

(58) Field of Classification Search
CPC . E02F 9/2004; E02F 9/26; E02F 9/261; E02F 9/264; B60Y 2200/412; B60K 2370/12; B60K 2370/128; B60K 2370/135; B60K 2370/151; B60K 2370/152; B60K 35/00; B60K 37/06
See application file for complete search history.

(56) References Cited

U.S. PATENT DOCUMENTS

| | | | | |
|---|---|---|---|---|
| 7,039,867 | B1* | 5/2006 | Scheidig | G06F 3/033 715/810 |
| 7,937,162 | B2* | 5/2011 | Thomson | G06F 9/453 702/29 |
| 10,508,417 | B2* | 12/2019 | Hasegawa | G06T 11/40 |
| 2005/0192732 | A1* | 9/2005 | Narisawa | B66C 23/905 700/83 |
| 2006/0092033 | A1* | 5/2006 | Hoff | G06F 11/0739 700/83 |
| 2008/0188954 | A1* | 8/2008 | Thomson | G05B 19/409 701/50 |
| 2009/0070672 | A1 | 3/2009 | Hartwick | |
| 2009/0090208 | A1 | 4/2009 | Diccion | |
| 2014/0100712 | A1* | 4/2014 | Nomura | E02F 9/26 701/1 |
| 2016/0024757 | A1* | 1/2016 | Nomura | E02F 9/26 701/32.3 |
| 2017/0021769 | A1* | 1/2017 | Izumikawa | B60K 35/00 |
| 2017/0028919 | A1 | 2/2017 | Izumikawa et al. | |
| 2017/0175364 | A1 | 6/2017 | Hasegawa et al. | |
| 2017/0275854 | A1 | 9/2017 | Izumikawa | |
| 2017/0322624 | A1* | 11/2017 | Niccolini | G08C 17/02 |
| 2018/0016771 | A1 | 1/2018 | Izumikawa | |

FOREIGN PATENT DOCUMENTS

| | | |
|---|---|---|
| WO | 2015/163381 | 10/2015 |
| WO | 2016/098741 | 6/2016 |
| WO | 2016/111148 | 7/2016 |
| WO | 2016/158539 | 10/2016 |

\* cited by examiner

SHOVEL

CROSS-REFERENCE TO RELATED APPLICATION

This application is a continuation of International Application No. PCT/JP2018/008654 filed on Mar. 6, 2018 and designated the U.S., which claims priority to Japanese Patent Application No. 2017-043247 filed on Mar. 7, 2017, and Japanese Patent Application No. 2017-252215 filed on Dec. 27, 2017. The contents of these applications are incorporated herein by reference in their entirety.

BACKGROUND

Technical Field

The present disclosure relates to a shovel.

Description of Related Art

In order to efficiently and precisely perform work such as excavation by an attachment, skilled operation techniques are required for an operator of a shovel (may also be referred to as an "excavator"). Accordingly, a system for guiding an operation of an excavator (hereinafter referred to as a "machine guidance system") is known to enable an operator who has little experience in operating a shovel to work accurately.

To use the machine guidance system efficiently, various settings such as an input of a bucket size need to be made in advance. These settings are typically made through a setting screen displayed on a display device installed in a cab of a shovel. The setting screen is displayed, for example, by pressing a hardware switch located near the display device.

SUMMARY

A shovel according to an embodiment of the present invention includes a lower traveling body, an upper turning body rotatably mounted on the lower traveling body, an operator's compartment provided to the upper turning body, a display device provided in the operator's compartment, and an input device provided in the operator's compartment. The display device is capable of displaying a setting screen for a construction support system using information and communication technology, and a function to switch a screen displayed on the display device to the setting screen is assigned to the input device.

DETAILED DESCRIPTION

Figure 1:
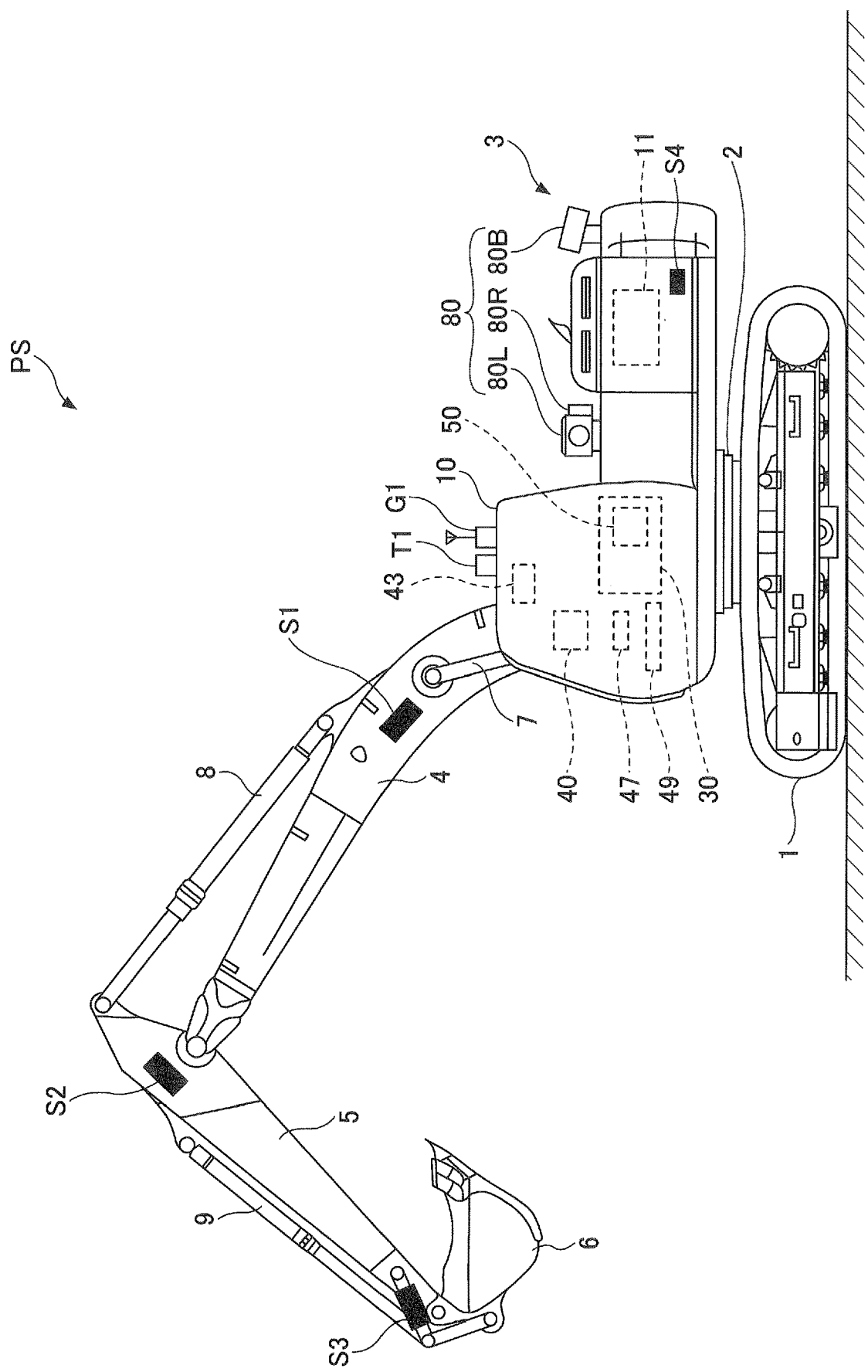
FIG. 1 is a side view of a shovel according to an embodiment of the present invention.

Hereinafter, a shovel according to an embodiment of the present invention will be described with reference to the drawings. In each of the drawings, the same components are denoted by the same reference numerals, and duplicate descriptions may be omitted.

In order to display a setting screen, an operator of a shovel needs to stretch out his/her hand to a display device and to press a hardware switch. In particular, a setting screen for a construction support system using information and communications technology (ICT) (hereinafter referred to as an "ICT setting screen") such as a machine guidance system may be frequently used. Thus, pressing the hardware switch to display the setting screen may be troublesome for the operator.

The present disclosure aims at providing a shovel capable of displaying the ICT setting screen more easily.

FIG. 1 is a side view illustrating a shovel PS according to an embodiment of the present invention. The upper turning body 3 is rotatably mounted on the lower traveling body 1 of the shovel PS, through a turning mechanism 2. A boom 4 is attached to the upper turning body 3. An arm 5 is attached to the tip of the boom 4. A bucket 6 is attached to the tip of the arm 5 as an end attachment (work portion).

The boom 4, the arm 5, and the bucket 6 form an excavation attachment as an example of an attachment, and are hydraulically driven by a boom cylinder 7, an arm cylinder 8, and a bucket cylinder 9, respectively. A boom angle sensor S1 is attached to the boom 4, an arm angle sensor S2 is attached to the arm 5, and a bucket angle sensor S3 is attached to the bucket 6. The boom angle sensor S1, the arm angle sensor S2, and the bucket angle sensor S3 may be collectively referred to as an "orientation sensor". The orientation sensor detects an orientation of the attachment. The orientation sensor is used, for example, to derive the position of the work portion of the attachment.

The boom angle sensor S1 detects the rotation angle of the boom 4. The boom angle sensor S1 is, for example, an acceleration sensor that detects a rotational angle of the boom 4 relative to the upper turning body 3, by detecting a tilt relative to a horizontal plane.

The arm angle sensor S2 detects the rotational angle of the arm 5. The arm angle sensor S2 is, for example, an acceleration sensor that detects a rotational angle of the arm 5 relative to the boom 4, by detecting a tilt relative to the horizontal plane.

The bucket angle sensor S3 detects the rotational angle of the bucket 6. The bucket angle sensor S3 is, for example, an acceleration sensor that detects a rotational angle of the bucket 6 relative to the arm 5, by detecting a tilt relative to the horizontal plane.

Each of the boom angle sensor S1, the arm angle sensor S2, and the bucket angle sensor S3 may be a potentiometer utilizing a variable resistor, a stroke sensor for detecting a stroke amount of a corresponding hydraulic cylinder, a rotary encoder for detecting the rotational angle around a coupling, or the like. Alternatively, each of the boom angle sensor S1, the arm angle sensor S2, and the bucket angle sensor S3 may be configured by a combination of a gyrosensor and an acceleration sensor.

The upper turning body 3 is equipped with a power source such as an engine 11, a body tilt sensor S4, and an imaging device 80.

The body tilt sensor S4 detects a tilt angle of the upper turning body 3. The body tilt sensor S4 is, for example, an acceleration sensor that detects the tilt angle of the upper turning body 3 by detecting a tilt relative to the horizontal plane. The body tilt sensor S4 may be configured by a combination of a gyrosensor and an acceleration sensor.

The imaging device 80 is provided on the upper turning body 3. The imaging device 80 includes a left camera 80L for capturing an image of space on the left side of the shovel PS, a right camera 80R for capturing an image of space on the right side, and a back camera 80B for capturing an image of space on the rear side. The left camera 80L, the right camera 80R, and the back camera 80B are digital cameras having image sensors such as a CCD or a CMOS, and each transmits a captured camera image to a display device 40 provided in a cab 10.

The upper turning body 3 is provided with the cab 10 as an operator's compartment. A positioning device (GNSS receiver) G1 and a communication device T1 are provided at a top of the cab 10. The positioning device G1 detects a position of the shovel PS and provides position data to a machine guidance system 50 in a controller 30. The communication device T1 controls communication with the outside and provides data obtained from the outside to the machine guidance system 50 in the controller 30. Also, the controller 30, the display device 40, an audio output device 43, and a storage device 47 are provided in the cab 10.

The controller 30 functions as a main control unit for performing drive control of the shovel PS. The controller 30 is configured by an arithmetic processing device including a CPU and an internal memory. Various functions of the controller 30 are realized by the CPU executing a program stored in the internal memory.

The controller 30 also functions as the machine guidance system 50 for guiding an operation of the shovel PS. The machine guidance system 50 informs an operator of work information representing a relative relationship between a work portion of the attachment and a target surface which is a surface of a target terrain set by the operator, a construction manager, etc., such as a distance between the target surface and the work portion of the attachment. The work portion of the attachment is, for example, the tip (toe) of the bucket 6 as an end attachment, the back surface of the bucket 6, the tip of the breaker as an end attachment, and the like. The machine guidance system 50 informs the operator of the work information through the display device 40, the audio output device 43, or the like and guides the operation of the shovel PS. The machine guidance system 50 may perform a machine control function that automatically or semi-automatically operates the shovel PS.

Although the machine guidance system 50 is incorporated into the controller 30 in the example of FIG. 1, the machine guidance system 50 may be provided separately from the controller 30. In this case, the machine guidance system 50 may be configured by an arithmetic processing device including a CPU and an internal memory, as well as the controller 30. Various functions of the machine guidance system 50 may be implemented by the CPU executing a program stored in the internal memory.

The display device 40 is configured to display an image containing various types of working information, in response to a command from the machine guidance system 50 included in the controller 30. The display device 40 is, for example, a liquid crystal display connected to the machine guidance system 50.

The audio output device 43 outputs various types of voice information in response to an audio output command from the machine guidance system 50 included in the controller 30. The audio output device 43 includes, for example, a speaker connected to the machine guidance system 50. The audio output device 43 may also include an alarm unit such as a buzzer.

The storage device 47 stores various types of information. The storage device 47 may be configured by a non-volatile storage medium such as a semiconductor memory. The storage device 47 stores design data and the like. Various types of information output by the machine guidance system 50 or the like may be stored.

The gate lock lever 49 is a mechanism that prevents the shovel PS from being operated incorrectly, and is disposed between a door of the cab 10 and an operator's seat. When an operator is seated on the operator's seat and pulls the gate lock lever 49, the shovel PS becomes in a state in which various operating devices are operable. At this time, the operator is intercepted by the gate lock lever 49, and is in a condition difficult to exit from the cab 10. Conversely, by depressing the gate lock lever 49, the operator can make the various operating devices inoperable. In this state, because the operator is not blocked by the gate lock lever 49, the operator is in a state easy to exit from the cab 10.

Figure 2:
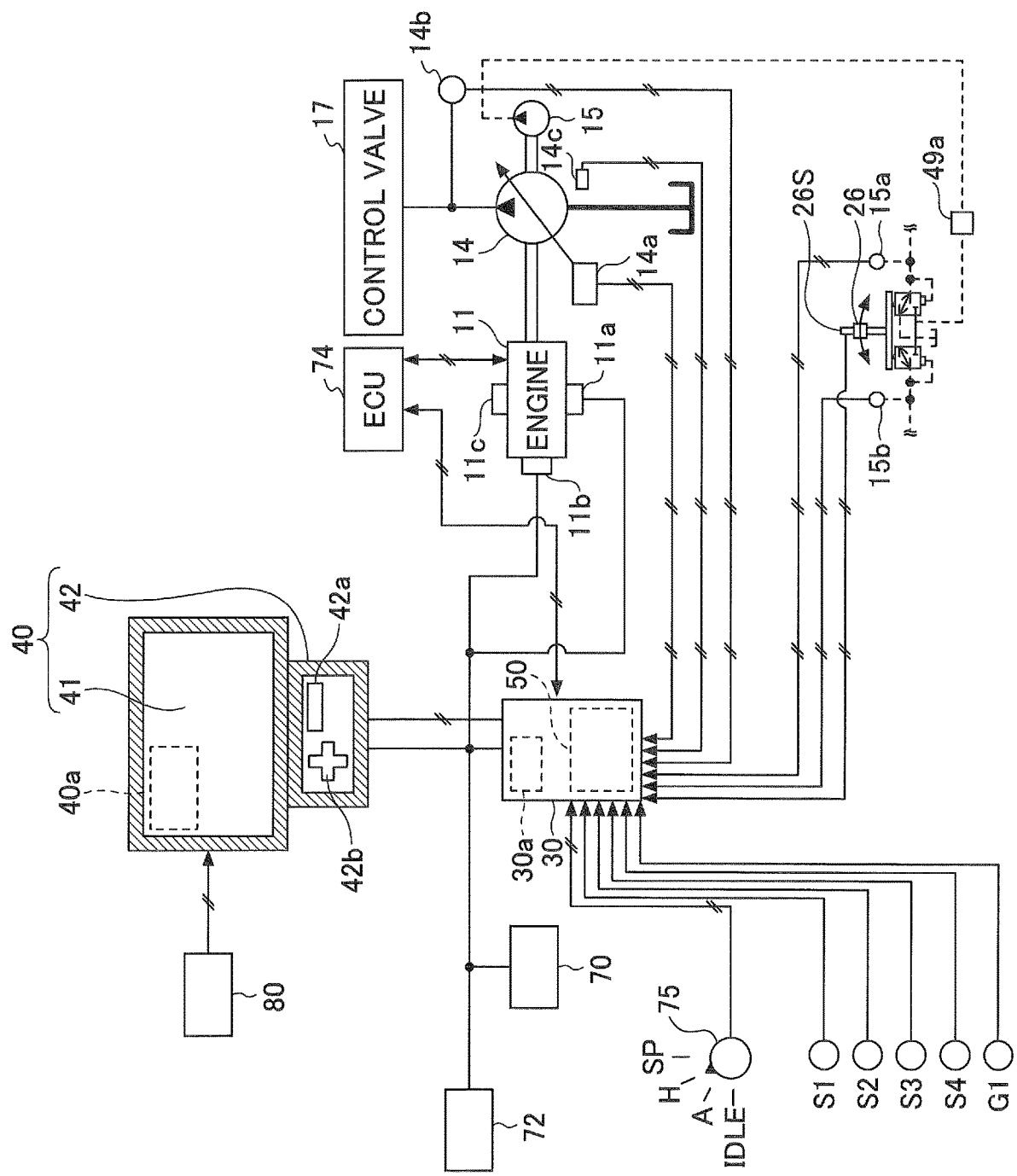
FIG. 2 is a system configuration diagram of the shovel of FIG. 1.

FIG. 2 illustrates an example of a configuration of a basic system installed in the shovel PS. The basic system includes the engine 11, the controller 30, the display device 40, and the like.

The display device 40 is provided in the cab 10, and is configured to display an image including work information provided by the machine guidance system 50. The display device 40 is connected to the controller 30 including the machine guidance system 50 via a communication network such as a CAN, a LIN, or a dedicated line.

The display device 40 includes a conversion processing unit 40a that generates an image to be displayed on an image display unit 41. The conversion processing unit 40a converts data to be displayed on the image display unit 41 to image data, among various types of data input to the display device 40 from the controller 30. The data input from the controller 30 to the display device 40 includes, for example, data related to an engine coolant temperature, data related to a hydraulic oil temperature, data related to a residual amount of urea water, data related to a remaining amount of fuel, and the like.

Based on the converted image data and image data obtained from the imaging device 80, the conversion processing unit 40a generates image data to be displayed on the image display unit 41. Therefore, the display device 40 is configured to receive image data from each of the left camera 80L, the right camera 80R, and the back camera 80B.

The conversion processing unit 40a outputs the generated image data to the image display unit 41. The image display unit 41 displays an image corresponding to the image data generated by the conversion processing unit 40a. The conversion processing unit 40*a* may be provided, for example, in the controller 30 rather than the display device 40. In this case, the imaging device 80 is connected to the controller 30.

The display device 40 includes an input device 42. The input device 42 is a device for the operator of the shovel PS to input various types of information to the controller 30. In the example of FIG. 2, the input device 42 is a pushbutton switch provided on a switch panel. The input device 42 may be a membrane switch or a touch panel, for example. Specifically, the input device 42 includes a display switching button 42*a* and a direction button 42*b*.

The display switching button 42*a* is a button for switching images displayed on the image display unit 41. Each time the display switching button 42*a* is pressed, a screen displayed on the image display unit 41 is switched. Types of the screens displayed on the image display unit 41 include a main screen and an information display/setting screen.

The direction button 42*b* is an example of an operation unit for inputting a direction. In the example of FIG. 2, a cross-shape button configured such that four directions (up, down, left, and right) can be input is employed. Alternatively, a set of four independent buttons (up button, down button, left button, and right button) may be employed. By operating the direction button 42*b*, the operator can switch the screens, move a cursor displayed on the screen, or change a value of the selected item by moving the cursor.

The display device 40 operates by receiving electric power supplied from a battery 70. The battery 70 is charged with power generated by an alternator 11*a* (generator) of the engine 11. The electric power of the battery 70 is also supplied to an electrical device 72 of the shovel PS other than the controller 30 and the display device 40. A starter lib of the engine 11 is also driven by the electric power from the battery 70 to start the engine 11.

The engine 11 is connected to a main pump 14 and a pilot pump 15, and is controlled by an engine controller (ECU 74). The ECU 74 outputs various types of data indicating states of the engine 11 to the controller 30. The various types of data indicating the states of the engine 11 include, for example, data related to a temperature of the coolant detected by a water temperature sensor 11*c*. The controller 30 is configured to store various types of data in a storage unit 30*a* inside the controller 30, and to transmit the various types of data to the display device 40 as needed.

The main pump 14 is a hydraulic pump for supplying hydraulic oil to a control valve 17 via a hydraulic oil line. The main pump 14 is, for example, a swash plate type variable capacity hydraulic pump.

The pilot pump 15 is a hydraulic pump for supplying hydraulic oil to various hydraulic control devices via a pilot line. The pilot pump 15 is, for example, a fixed capacity hydraulic pump.

The control valve 17 is a hydraulic controller that controls a hydraulic system in the shovel PS. The control valve 17 is configured to selectively supply hydraulic oil discharged by the main pump 14 to hydraulic actuators such as the boom cylinder 7, the arm cylinder 8, the bucket cylinder 9, a driving hydraulic motor, and a rotating hydraulic motor. The rotating hydraulic motor may be replaced with an electric motor for rotating as an electric actuator.

An operation device 26 is used for operating an actuator, and is provided in the cab 10. The operation device 26 includes an operation lever and an operation pedal. The actuator includes at least one of a hydraulic actuator and an electric actuator. For example, when one of the operation devices 26 is operated, hydraulic oil is supplied from the pilot pump to a pilot port of a flow control valve of a corresponding hydraulic actuator. Each of the pilot ports is supplied with hydraulic oil of a pressure in accordance with a direction and amount of an operation of the corresponding operation device 26.

The controller 30 acquires various types of data, such as data to be described below. The data acquired by the controller 30 is stored into the storage unit 30*a*.

A regulator 14*a* of the main pump 14, which is a swash plate type variable capacity hydraulic pump, transmits data related to a tilted angle of a swash plate to the controller 30. A discharge pressure sensor 14*b* transmits data indicating a discharge pressure of the main pump 14 to the controller 30. These data (data representing a physical quantity) are stored in the storage unit 30*a*. Also, an oil temperature sensor 14*c* is provided in a path between the main pump 14 and a tank in which the hydraulic oil to be drawn by the main pump 14 is stored. The oil temperature sensor 14*c* transmits, to the controller 30, data related to a temperature of the hydraulic oil flowing through the path.

Pressure sensors 15*a* and 15*b* detect pilot pressure that is transmitted to the control valve 17 when the operation device 26 is operated, and send data related to the detected pilot pressure to the controller 30. The operation lever as the operation device 26 is provided with a switch button 26S as another example of the input device 42. The operator can send a command signal to the controller 30 by operating the switch button 26S while operating the operation lever.

An engine speed adjustment dial 75 is provided in the cab 10 of the shovel PS. The engine speed adjustment dial 75 is a dial for adjusting a revolution speed of the engine (hereinafter referred to as an "engine RPM"), and the engine RPM can be changed in a stepwise manner. In the present embodiment, the engine speed adjustment dial 75 is configured such that the engine RPM can be switched in four steps: an SP mode, an H mode, an A mode, and an idling mode. The engine speed adjustment dial 75 transmits data related to a setting state of the engine RPM to the controller 30. FIG. 2 illustrates a state in which the H mode is selected by the engine speed adjustment dial 75.

The SP mode is a speed mode selected when an amount of work is to be prioritized, and the highest engine RPM is used in the SP mode. The H mode is a speed mode selected when it is desired to balance the amount of work and fuel efficiency, and the second highest engine RPM is used in the H mode. The A mode is a speed mode selected when the shovel PS is operated at a low noise while prioritizing fuel efficiency, and the third highest engine RPM is used in the A mode. The idling mode is a speed mode selected when the engine is to be in an idling state, and the lowest engine RPM is used in the idling mode. The engine 11 is controlled at a constant revolution speed corresponding to the selected speed mode set by the engine speed adjustment dial 75.

Figure 3:
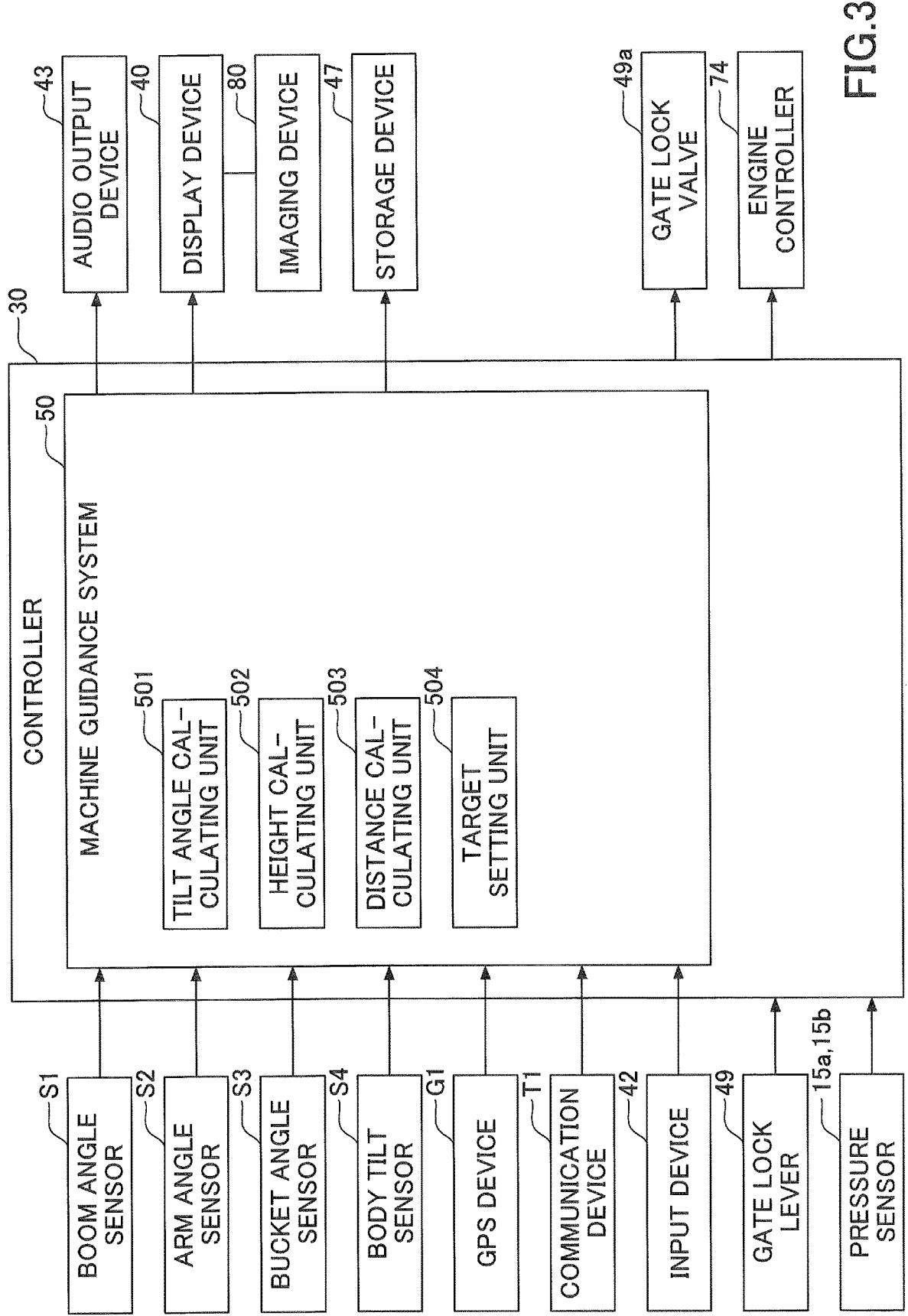
FIG. 3 is a diagram illustrating an example of a configuration of a machine guidance system.

Next, the controller 30 of the shovel PS will be described with reference to FIG. 3. FIG. 3 illustrates an example of a configuration of the controller 30.

The controller 30 controls an overall operation of the shovel PS. The controller 30 is configured to close a gate lock valve 49*a* while the gate lock lever 49 is depressed, and to open the gate lock valve 49*a* while the gate lock lever 49 is pulled up. The gate lock valve 49*a* is a switching valve provided at an oil path between the control valve 17 and the operation device 26. Here, the gate lock valve 49*a* is configured to open and close by a command from the controller 30, but may be mechanically connected to the gate lock lever 49, and may be opened and closed in response to an operation of the gate lock lever 49.

When the gate lock valve 49a is in a closed state, the gate lock valve 49a shuts off a flow of the hydraulic oil between the control valve 17 and the operation device 26 to disable an operation of the operation device 26. When the gate lock valve 49a is in an opened state, the gate lock valve 49a causes the control valve 17 to communicate with the operation device 26 to enable an operation of the operation device 26.

The controller 30 detects a direction and amount of an operation of the operation device 26, based on the pilot pressure detected by the pressure sensors 15a and 15b when the gate lock valve 49a is opened and the operation of the operation device 26 is effective.

The controller 30 may control whether or not to provide guidance by the machine guidance system 50, in addition to controlling the overall operation of the shovel PS. For example, when it is determined that the shovel PS is suspended, the controller 30 may output a guidance abort command to the machine guidance system 50 to stop guidance by the machine guidance system 50.

The controller 30 may output the guidance abort command to the machine guidance system 50 when outputting an auto idle stop command to the ECU 74. Alternatively, the controller 30 may output the guidance abort command to the machine guidance system 50 when it is determined that the gate lock lever 49 is depressed.

Next, various functional elements of the machine guidance system 50 will be described with reference to FIG. 3. FIG. 3 is a functional block diagram illustrating an example of a configuration of the machine guidance system 50.

The machine guidance system 50 receives information that is output from the boom angle sensor S1, the arm angle sensor S2, the bucket angle sensor S3, the body tilt sensor S4, the positioning device G1, the input device 42, and the like. Then, based on the received information and the information stored in the storage device 47, various calculations are performed, and result of the calculation is output to the display device 40, the audio output device 43, or the like.

For example, the machine guidance system 50 calculates a height of a work portion of the attachment, and outputs, to at least one of the display device 40 and the audio output device 43, a control command according to a magnitude of distance between the height of the work portion and a predetermined target height. The display device 40 that receives the control command displays an image representing the magnitude of the distance. The audio output device 43 that receives the control command outputs a sound representing the magnitude of the distance. The target height is a concept that includes a target depth. The target height is, for example, a height entered by the operator as a vertical distance to a reference position after the work portion is made to contact with the reference position. The reference position typically includes a known latitude, longitude, and altitude. Hereinafter, information about the magnitude of the distance between the height of the work portion and the target height of the attachment displayed on the display device 40 is referred to as "work portion guidance information". The operator can perform an operation while checking a change of the distance by looking at the work portion guidance information.

In order to provide the above-described guidance, the machine guidance system 50 includes a tilt angle calculating unit 501, a height calculating unit 502, a distance calculating unit 503, a target setting unit 504, or the like.

The tilt angle calculating unit 501 calculates a tilt angle of the shovel PS, which is a tilt angle of the upper turning body 3 relative to the horizontal plane, based on the detection signal from the body tilt sensor S4. The tilt angle of the shovel PS includes, for example, a tilt angle of a front-rear axis of the upper turning body 3 relative to the horizontal plane and a tilt angle of the left-right axis of the upper turning body 3 relative to the horizontal plane.

The height calculating unit 502 calculates a height of the work portion of the attachment relative to a reference plane based on the tilt angle calculated by the tilt angle calculating unit 501 and the rotational angles of the boom 4, the arm 5, and the bucket 6 calculated from the detection signal of the orientation sensor. The reference plane is, for example, a virtual plane that includes a plane on which the shovel is located. In the example of FIG. 3, the tip of the bucket 6 (nail) corresponds to the work portion of the attachment because the excavation is performed at the tip of the bucket 6. When an operation such as leveling sand on the back side of the bucket 6 is performed, the back side of the bucket 6 corresponds to the work portion of the attachment.

The distance calculating unit 503 calculates a distance between the height of the work portion calculated by the height calculating unit 502 and the target height. In the example of FIG. 3, a distance between the height of the tip (nail) of the bucket 6 calculated by the height calculating unit 502 and the target height is calculated.

The target setting unit 504 sets a target value used for a machine guidance function or a machine control function. The target setting unit 504 sets the target value based on information about the positions of a predetermined portion of the excavation attachment at two time points. For example, based on two sets of coordinates each indicating positions of the tip of the bucket 6 at two time points, an angle formed between a virtual straight line passing through the two sets of coordinates and the horizontal plane is calculated, and the angle is set as a target slope angle. Each of the two time points is a time when a predetermined condition is satisfied. Examples of the time points include a time when a predetermined switch is pressed, and a time when a predetermined time has elapsed while the excavation attachment remains stationary. The target slope angle may include zero degrees.

The target setting unit 504 may display geometric information on the display device 40 using the information about positions of the predetermined portion of the excavation attachment at two time points. The geometric information is information related to a result of surveying by the shovel. For example, based on coordinates of positions of the tip of the bucket 6 at two time points, the target setting unit 504 displays an angle as geometric information in the display device 40 formed between a virtual straight line passing through the two sets of coordinates and a horizontal plane. The two sets of coordinates, or a horizontal distance and a vertical distance between the two sets of coordinates may be displayed as geometric information. Here, a first time of the two time points is, as described above, a time when a predetermined condition is satisfied. A second time of the two time points is the current time. As described above, the geometric information is displayed to cause the operator to recognize a positional relationship between the coordinates of a predetermined portion registered at the first time and the current coordinates of the predetermined portion.

Figure 4:
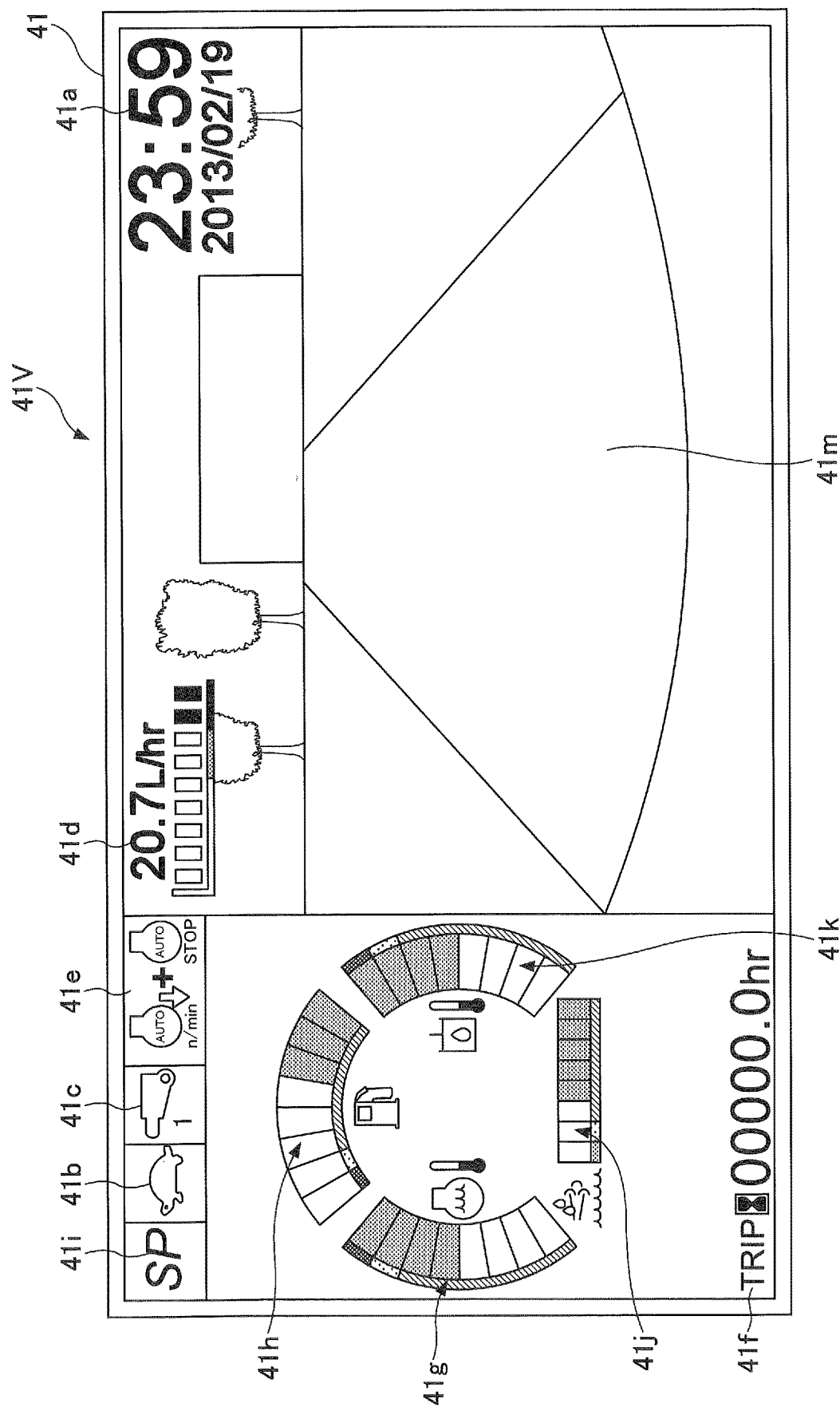
FIG. 4 is a diagram illustrating an example of a main screen.

Next, a screen configuration displayed on the display device 40 will be described. FIG. 4 is a diagram illustrating an example of a main screen 41V displayed on the image display unit 41 of the display device 40.

The main screen 41V includes a date and time display area 41a, a driving mode display area 41b, an attachment display area 41*c*, an average fuel consumption rate display area 41*d*, an engine control status display area 41*e*, an engine operating time display area 41*f*, a coolant temperature display area 41*g*, a fuel remaining amount display area 41*h*, a revolution mode display area 41*i*, a urea water remaining amount display area 41*j*, a hydraulic oil temperature display area 41*k*, and a camera image display area 41*m*. Each of the driving mode display area 41*b*, the attachment display area 41*c*, the engine control status display area 41*e*, and the revolution mode display area 41*i* is an example of a setting status display unit that displays a setting status of the shovel. Each of the average fuel consumption rate display area 41*d*, the engine operating time display area 41*f*, the coolant temperature display area 41*g*, the fuel remaining amount display area 41*h*, the urea water remaining amount display area 41*j*, and the hydraulic oil temperature display area 41*k* is an example of an operation status display unit indicating an operation status of the shovel.

The date and time display area 41*a* is an area that displays a current date and time. The driving mode display area 41*b* is an area that displays a current travel mode. The attachment display area 41*c* is an area that displays an image representing an attachment that is currently attached. The average fuel consumption rate display area 41*d* is an area that displays a current average fuel efficiency. The engine control status display area 41*e* is an area that displays a control status of the engine 11. The coolant temperature display area 41*g* is an area indicating the temperature status of the current engine cooling water. The fuel remaining amount display area 41*h* is an area that displays a status of a remaining amount of fuel stored in a fuel tank 55. The revolution mode display area 41*i* is an area that displays a current speed mode. The urea water remaining amount display area 41*j* is an area that displays a status of a residual amount of urea water stored in a urea water tank. The hydraulic oil temperature display area 41*k* is an area that displays a status of a hydraulic oil temperature in the hydraulic oil tank. The camera image display area 41*m* is an area on which a camera image is displayed.

Figure 5:
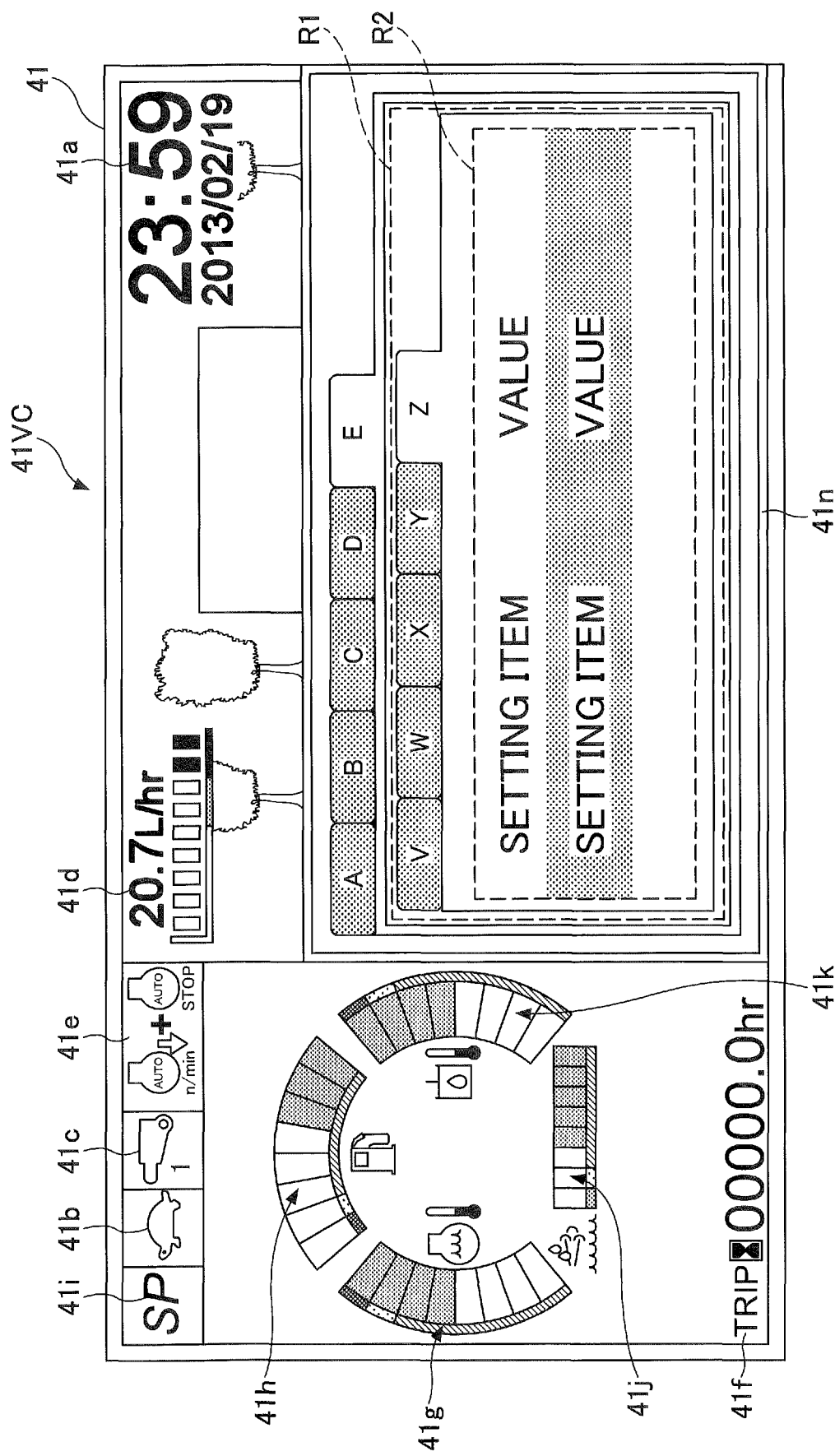
FIG. 5 is a diagram illustrating an example of an information display/setting screen.

Next, the information display/setting screen displayed on the display device 40 will be described with reference to FIG. 5. FIG. 5 is a diagram illustrating an example of the information display/setting screen 41VC displayed on the image display unit 41 of a display device 40. The information display/setting screen 41VC differs from the main screen 41V of FIG. 4 in that the information display/setting screen 41VC includes a hierarchical information display area 41*n* instead of the camera image display area 41*m*. Specifically, when an operation is started, the hierarchical information display area 41*n* is switched to the camera image display area 41*m*, and the camera image is displayed. However, the information display/setting screen 41VC is otherwise common to the main screen 41V. Therefore, descriptions of the common parts are omitted, and different parts will be explained in detail.

The hierarchical information display area 41*n* is a region that displays information having a hierarchical structure. In the example of FIG. 5, the hierarchical information display area 41*n* displays information having a two-layer hierarchical structure using five tabs per hierarchy.

FIG. 5 illustrates a procedure for changing a value of a specific setting item in the hierarchical information display area 41*n*. Specifically, FIG. 5 illustrates a procedure in which the operator changes a value of the setting item in the fifth tab of the second layer, by using the display switching button 42*a* and the direction button 42*b*.

When the camera image display area 41*m* is displayed instead of the hierarchical information display area 41*n*, the operator first causes the display device 40 to display the information display/setting screen 41VC to switch the camera image display area 41*m* to the hierarchical information display area 41*n*, by pressing the display switching button 42*a*. In the hierarchical information display area 41*n* of the information display/setting screen 41VC, a first image (not illustrated) is displayed, in which a first tab "A" of the first layer is in a selected state and the other four tabs, which are second to fifth tabs "B" to "E", are in a non-selected state.

In FIG. 5, an image of a state (a 5Z2 image to be described below) in which the fifth tab "E" of the first layer is selected and the first to fourth tabs "A" to "D" are not selected is displayed. Various types of information are displayed in a main area R1 indicated by a dashed line.

A screen in which the first image is displayed in the hierarchical information display area 41*n* is, for example, a fuel consumption rate information screen. The fuel consumption rate information screen displays, for example, changes in past fuel consumption rates (e.g., amount of fuel consumed per unit time).

When the operator presses a right portion of the direction button 42*b* while the first image is displayed, an image displayed on the hierarchical information display area 41*n* is switched to a second image (not illustrated). The second image displays a state in which the second tab "B" of the first layer is selected and in which the other four tabs, the first and third to fifth tabs "A" and "C" to "E", are not selected. Various types of information are displayed in the main area R1, similarly to the first image. A screen in which the second image is displayed in the hierarchical information display area 41*n* is, for example, a machine status information screen. The machine status information screen displays, for example, past changes in engine speed and the like.

When the operator presses the right portion of the direction button 42*b* while the second image is displayed, an image displayed in the hierarchical information display area 41*n* is switched to a third image (not illustrated). When the operator presses the right portion of the direction button 42*b* while the third image is displayed, an image displayed in the hierarchical information display area 41*n* is switched to a fourth image (not illustrated).

In the third image, the third tab "C" in the first layer is in a selected state, and the four tabs, which are the first, second, fourth, and fifth tabs "A", "B", "D" and "E", are in non-selected states. In the fourth image, the fourth tab "D" in the first layer is in a selected state, and the four tabs, which are the first to third tabs "A" to "C" and the fifth tab "E", are in non-selected states. Various types of information are displayed in the main area R1, similarly to the first image. A screen in which the third image is displayed in the hierarchical information display area 41*n* is, for example, a maintenance information screen, and a screen in which the fourth image is displayed in the hierarchical information display area 41*n* is, for example, an attachment option information screen.

When the operator presses the right portion of the direction button 42*b* while the fourth image is displayed, an image displayed in the hierarchical information display area 41*n* is switched to a fifth image (not illustrated). The fifth image displays a state in which the fifth tab "E" in the first layer is selected and in which the four tabs, the first to fourth tabs "A" to "D" are not selected. The fifth image includes five tabs in the second layer in the main area R1. A screen in which the fifth image is displayed in the hierarchical information display area 41*n* is, for example, an ICT setting screen for a construction support system using information and communication technology of the machine guidance system 50 and the like. For example, the construction support system displays the ICT setting screen that enables a setting of a relative relationship between the work portion of the attachment (e.g., the tip of the bucket 6, the back of the bucket 6, etc.) and a target surface, to support construction using the shovel. The operator of the shovel PS can perform a setting of the machine guidance function or the machine control function, by using the ICT setting screen.

When the operator presses the right portion of the direction button 42b while the fifth image is displayed, an image displayed in the hierarchical information display area 41n is switched to the first image. However, when the operator presses a lower portion of the direction button 42b while the fifth image is displayed, an image displayed in the hierarchical information display area 41n is switched to an image called "5V image" (not illustrated).

The 5V image displays a state in which a first tab "V" in the second layer is selected and the other four tabs, second to fourth tabs "W" to "Z", are not selected. In addition, values of the setting items are displayed in the main area. A screen in which the 5V image is displayed in the hierarchical information display area 41n is, for example, a dimension setting screen that is one of the ICT setting screens. In the dimension setting screen, for example, the size of the bucket 6 is set.

When the operator presses the right portion of the direction button 42b while the 5V image is displayed, an image displayed in the hierarchical information display area 41n is switched to an image called "5W image" (not illustrated). In the 5W image, the second tab "W" of the second layer is in a selected state, and the other four tabs, the first tab "V" and the third to fifth tabs "X" to "Z", are in non-selected states. In the main area, values of the setting item are displayed similarly to the 5V image. A screen in which the 5W image is displayed in the hierarchical information display area 41n is, for example, a buzzer setting screen that is one of the ICT setting screens. In the buzzer setting screen, for example, the frequency (high and low) and volume of a buzzer sound are set.

When the operator presses the right portion of the direction button 42b while the 5W image is displayed, an image displayed in the hierarchical information display area 41n is switched to an image called "5X image" (not illustrated). When the operator presses the right portion of the direction button 42b while the 5X image is displayed, an image displayed in the hierarchical information display area 41n is switched to an image called "5Y image" (not illustrated). When the operator presses the right portion of the direction button 42b while the 5Y image is displayed, an image displayed in the hierarchical information display area 41n is switched to an image called "5Z image" (not illustrated). In the 5X image, the third tab "X" in the second layer is in a selected state, and the four tabs, the first, second, fourth, and fifth tabs "V", "W", "Y" and "Z", are in non-selected states. In the 5Y image, the fourth tab "Y" in the second layer is in a selected state, and the four tabs, the first to third tabs "V" to "X" and the fifth tab "Z", are in non-selected states. In the 5Z image, the fifth tab "Z" in the second layer is in a selected state, and the four tabs, the first to fourth tabs "V" to "Y", are in non-selected states. On each of the main areas of the 5X to 5Z images, similar to the 5V image, values of the setting items are displayed.

A screen on which the 5X image is displayed in the hierarchical information display area 41n is, for example, a survey setting screen that is one of the ICT setting screens. In the survey setting screen, for example, whether or not use of the surveying mode is enabled is set. A screen on which the 5Y image is displayed in the hierarchical information display area 41n is, for example, a reference point setting screen that is one of the ICT setting screens. In the reference point setting screen, for example, whether or not use of a bucket benchmark set function is enabled is set. Details of the bucket benchmark set function will be described below. A screen on which the 5Z image is displayed in the hierarchical information display area 41n is, for example, the rotation angle reference setting screen, which is one of the ICT setting screens. In the turn angle reference setting screen, for example, whether or not use of a turn benchmark set function is enabled is set. Details of the turn benchmark set function will be described below.

When the operator presses the right portion of the direction button 42b while the 5Z image is displayed, an image displayed on the hierarchical information display area 41n is switched to the 5V image. In contrast, when the operator presses the lower portion of the direction button 42b while the 5Z image is displayed, an image displayed on the hierarchical information display area 41n is switched to an image called "5Z1 image" (not illustrated).

In the 5Z1 image, a first setting item in a main area of the fifth tab "Z" in the second layer is in a selected state, and a second setting item is in the unselected state.

When the operator presses the lower portion of the direction button 42b while the 5Z1 image is displayed, an image displayed on the hierarchical information display area 41n is switched to an image called "5Z2 image". FIG. 5 illustrates a state in which the 5Z2 image is displayed. In the 5Z2 image, the second setting item displayed on a main area R2 of the fifth tab "Z" in the second layer is in a selected state, and the first setting item is in a non-selected state. The second setting item in the selected state may be indicated by using a cursor or the like.

When the operator presses the lower portion of the direction button 42b while the 5Z2 image is displayed, an image displayed in the hierarchical information display area 41n is switched to the 5Z1 image. In contrast, when the operator presses the right portion of the direction button 42b while the 5Z2 image is displayed, a value of the second setting item is incremented (increased) by a predetermined amount. When the operator presses the left portion of the direction button 42b while the 5Z2 image is displayed, the value of the second setting item is decremented (decreased) by a predetermined amount.

By performing the above-described procedure, the operator can change values of any setting items. Specifically, in order to display the ICT setting screen, after the information display/setting screen 41VC is displayed by the operator pressing the display switching button 42a, the operator may press the right portion of the direction button 42b four times. The ICT setting screen may be displayed by pressing the left portion of the direction button 42b once. In the following, a series of operations that is performed to display the ICT setting screen is referred to as an "ICT setting screen display operation". Thereafter, the operator presses the lower portion of the direction button 42b once, and then presses the right portion of the direction button 42b four times to display the rotation angle reference setting screen. In order to display the rotation angle reference setting screen, the operator may press the lower portion of the direction button 42b once, and may press the left portion of the direction button 42b once. Thereafter, after the operator sets the second setting item on the rotation angle reference setting screen to a selected state by pressing the lower portion of the direction button 42b twice, the operator can increase or decrease the value of the second setting item by pressing the right portion or the left portion of the direction button 42b.

As described above, a function to switch a screen displayed on the display device 40 to the information display/setting screen 41VC is assigned to the display switching button 42a of the input device 42. In addition, a function to switch a screen displayed on the display device 40 to the ICT setting screen is assigned to the direction button 42b of the input device 42. Therefore, the operator can cause the ICT setting screen to be displayed by operating the display switching button 42a and the direction button 42b.

In addition, to the direction button 42b of the input device 42, a function to select one of the setting items displayed on the ICT setting screen and a function to change the value of each of the setting items are assigned. Accordingly, the operator can change the value of each of the setting items by operating the direction button 42b.

Figure 6:
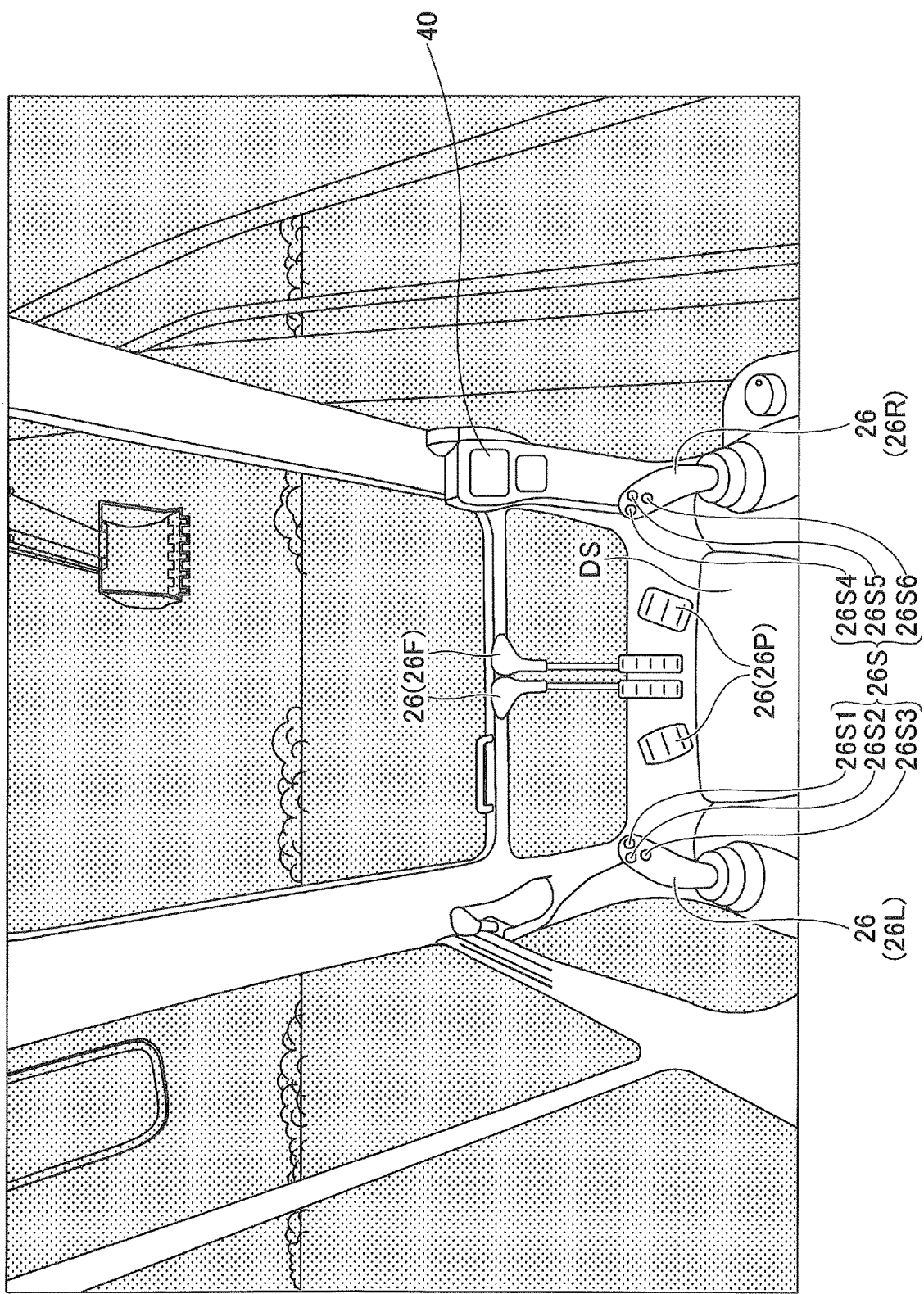
FIG. 6 is a perspective view of an interior of a cab.

Next, a procedure of displaying the ICT setting screen by using the switch button 26S provided in the cab 10 will be described with reference to FIG. 6. FIG. 6 is a perspective view of the interior of the cab 10, which illustrates a view from the operator's seat DS toward the front of the shovel.

In the example of FIG. 6, the operation device 26 includes a left operation lever 26L, a right operation lever 26R, a driving lever 26F, and a driving pedal 26P. The left operation lever 26L is an operation lever for opening and closing operations of the arm 5 and for rotating operation of the upper turning body. The right operation lever 26R is an operation lever for moving the boom 4 up and down and for opening and closing operations of the bucket 6. The driving lever 26F is an operation lever for actuating the driving hydraulic motor, and the driving pedal 26P is an operation pedal for actuating the driving hydraulic motor.

The switch button 26S includes three buttons on a tip of the left operation lever 26L and three buttons on a tip of the right operation lever 26R. The operator can operate the switch button 26S with his/her fingers without releasing his/her hands from the operation levers.

In the example of FIG. 6, the switch button 26S includes a laser setting button 26S1, a surveying mode button 26S2, a horn button 26S3, a bucket benchmark set button 26S4, a turn benchmark set button 26S5, and a one-touch idle button 26S6.

The laser setting button 26S1 is a button used to utilize a laser reference plane defined by a rotating laser level. For example, the operator presses the laser setting button 26S1 when a laser receiver attached to a side of the arm 5 receives laser light emitted by the rotating laser level. As a result, the shovel PS can recognize a height of a ground surface (the ground on which the shovel PS is located) with respect to the laser reference plane, a height of the tip of the bucket with respect to the laser reference plane, and the like, based on an orientation of the attachment at that time (when the laser setting button 26S1 is pressed) and a tilt angle of the upper turning body 3.

The surveying mode button 26S2 is a button for starting or terminating the surveying mode. The surveying mode is one of the operation modes of the shovel, and is selected when surveying is performed by using the shovel. In the example of FIG. 6, the surveying mode starts when the surveying mode button 26S2 is pressed.

Figure 7:
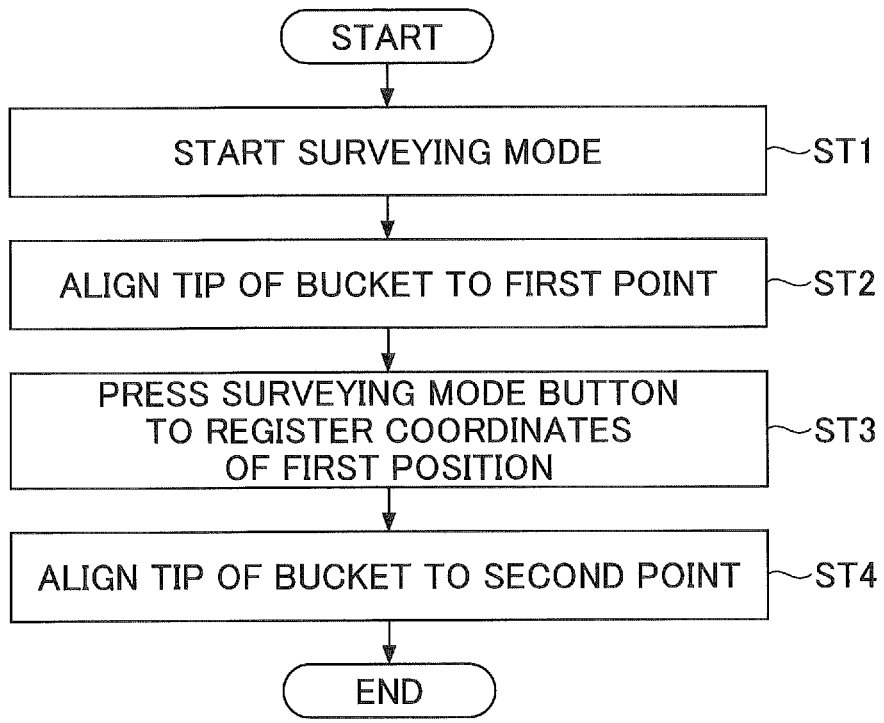
FIG. 7 is a flow chart illustrating a process flow in a surveying mode.

FIG. 7 describes a process in the surveying mode. FIG. 7 is a flowchart illustrating a flow of processing in the surveying mode.

First, the operator starts the surveying mode (step ST1). For example, the operator starts the surveying mode by pressing the surveying mode button 26S2 of the left operation lever 26L.

The operator then aligns the tip of the bucket 6 to a desired point (hereinafter referred to as a "first point") (step ST2). For example, the operator moves the excavation attachment by operating the left operation lever 26L and the right operation lever 26R, to bring the tip of the bucket 6 into contact with the first point. The controller 30 can calculate the position of the tip of the bucket 6 as coordinates of the first point, by utilizing an output of the orientation sensor.

Thereafter, the operator presses the surveying mode button 26S2 to register the coordinates of the first point (Step ST3). For example, the operator presses the surveying mode button 26S2 while the tip of the bucket 6 is in contact with the first point, to register the coordinates of the first point as a reference point.

Subsequently, the operator aligns the tip of the bucket 6 to another desired point (hereinafter referred to as a "second point") (step ST4). For example, the operator moves the excavation attachment by operating the left and right operation levers 26L and 26R, to bring the tip of the bucket 6 into contact with the desired second point. The controller 30 can calculate the position of the tip of the bucket 6 as coordinates of the second point, by utilizing an output of the orientation sensor.

The machine guidance system 50 calculates a horizontal distance and a vertical distance between the first and second points based on the coordinates of the first and second points, and displays the calculated distance on the display device 40. Thus, the operator can easily identify a horizontal distance and a vertical distance between any two points. The machine guidance system 50 may calculate and display an angle formed between a horizontal plane and a virtual plane including a virtual straight line passing through the first point and the second point. In this case, the operator can easily identify a gradient of a plane including any two points, relative to the horizontal plane.

The process for the surveying mode illustrated in FIG. 7 may be performed at a time of setting the target surface and at a time of confirming a finished state after construction. By performing the process for the surveying mode when confirming a finished state after construction, the operator can confirm whether geometric information of a construction surface calculated from the first and second points is within a target after construction. In addition, the operator can set a reference plane and a target surface based on a first point and a second point on a finishing (reference) stake, by performing the process for the surveying mode when setting the target surface.

The horn button 26S3 is a button for sounding a horn. The operator can sound the unillustrated horn attached to the shovel PS, by pressing the horn button 26S3 at a desired timing.

The bucket benchmark set button 26S4 is a button to perform the bucket benchmark set function, i.e., to set a benchmark (reference point) for the bucket. For example, the operator presses the bucket benchmark set button 26S4 while the tip of the bucket 6 is in contact with the reference point. The shovel PS registers, as the origin, the coordinates of the tip of the bucket 6 when the bucket benchmark set button 26S4 is pressed.

The turn benchmark set button 26S5 is a button for performing the turn benchmark set function, i.e., a button for setting a reference of the turn angle. For example, the operator presses the turn benchmark set button 26S5 while the upper turning body 3 is oriented toward the operator's desired direction by the turn operation. The shovel PS registers a rotation angle when the turn benchmark set button 26S5 is pressed as zero degrees.

The one-touch idle button 26S6 is a button for causing the engine 11 to be in an idling state. The operator can perform a one-touch idle function by pressing the one-touch idle button 26S6. That is, the engine RPM of the engine 11 can be lowered to idle speed.

A function of the construction support system and a function of the information display/setting screen 41VC may be assigned to the switch button 26S in a switchable manner such that the assigned function of the construction support system and the assigned function of the information display/setting screen 41VC can be switched based on a predetermined condition. For example, a function to switch the screen displayed on the display device 40 to the ICT setting screen may be assigned to the bucket benchmark set button 26S4 so as to be switchable to a function that is originally assigned to the bucket benchmark set button 26S4. In this case, when the bucket benchmark set button 26S4 is pressed while a predetermined condition is satisfied, the ICT setting screen is displayed similarly to a case in which when the ICT setting screen display operation is performed. That is, the operator can cause the ICT setting screen to display immediately without operating the direction button 42b many times. In contrast, when the bucket benchmark set button 26S4 is pressed while the predetermined condition is not satisfied, the function originally assigned to the bucket benchmark set button 26S4 is performed.

Examples of the aforementioned "predetermined condition" include a case in which a long press operation of the switch button 26S (e.g., the bucket benchmark set button 26S4) is performed, and a case in which two buttons (e.g., the horn button 26S3 and the bucket benchmark set button 26S4) of the multiple buttons included in the switch button 26S are simultaneously pressed. Also, an example of "a time when the predetermined condition is satisfied" may be a period while the gate lock lever 49 is depressed. Alternatively, the function of switching the screen displayed on the display device 40 to the ICT setting screen may be assigned, in a switchable manner, to a button other than the bucket benchmark set button 26S4.

According to the above-described configuration, for example, multiple types of screens are displayed on the display device 40 in a manner in which one of the screens displayed on the display device 40 is sequentially switched to another one of the screens in accordance with a given order, each time the direction button 42b serving as an operation unit is operated. Further, when the bucket benchmark set button 26S4 serving as the input device 42 is operated, the ICT setting screen is displayed regardless of the given order. As described above, when the bucket benchmark set button 26S4 is operated, the ICT setting screen is displayed on the display device 40 without occurrence of switching of the screens.

Figure 8:
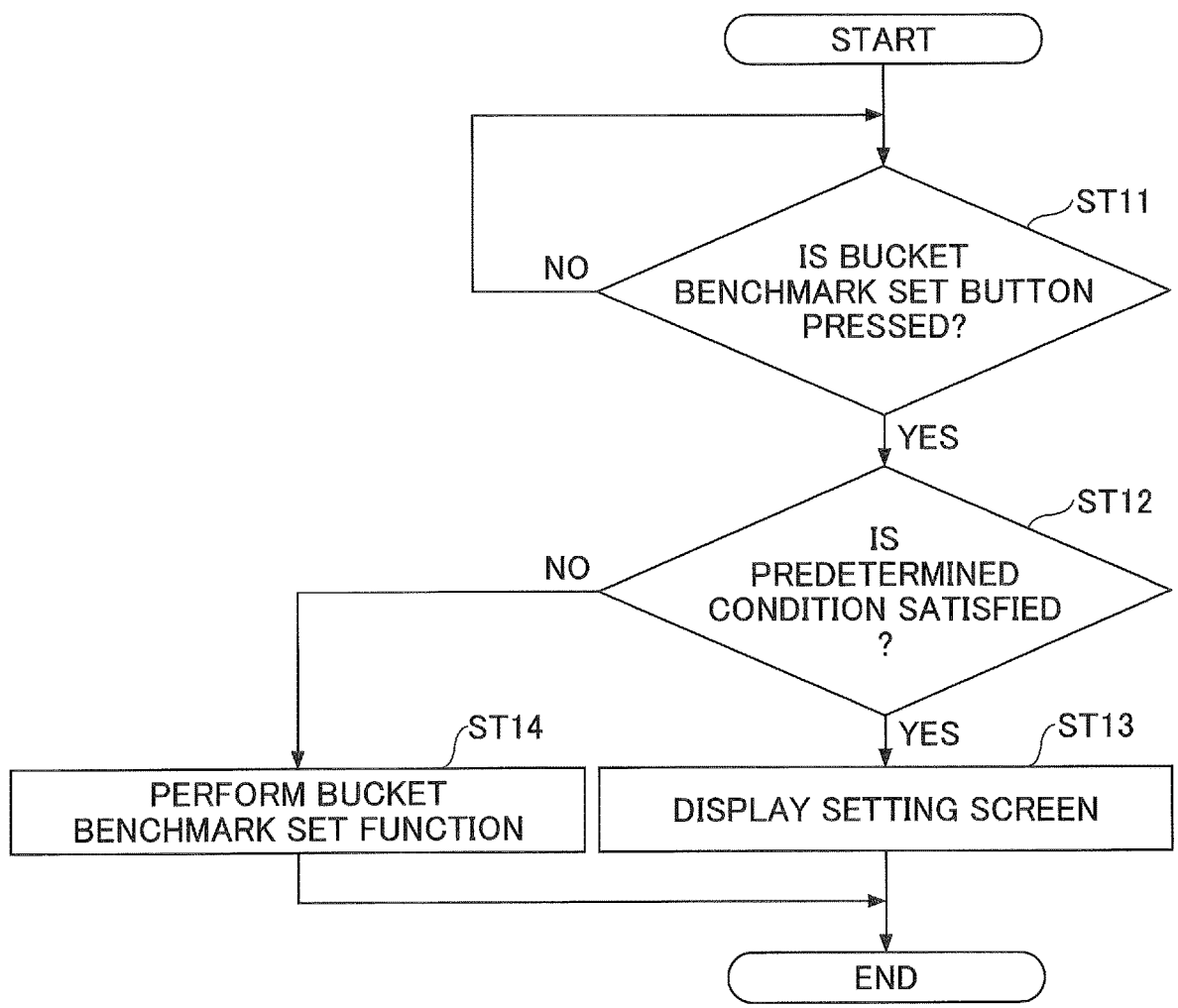
FIG. 8 is a flow chart illustrating an example of a process flow when a bucket benchmark set button is pressed.

FIG. 8 is a flow chart illustrating a process flow when the bucket benchmark set button 26S4 is pressed. The controller 30 repeats this process in a predetermined control cycle.

Initially, the controller 30 determines whether or not the bucket benchmark set button 26S4 is pressed (step ST11).

If it is determined that the bucket benchmark set button 26S4 is not pressed (NO in step ST11), the controller 30 repeats the determination of step ST11 until the bucket benchmark set button 26S4 is pressed.

If it is determined that the bucket benchmark set button 26S4 is pressed (YES in step ST11), the controller 30 determines whether or not a predetermined condition is satisfied (step ST12).

If it is determined that the predetermined condition is satisfied (YES in step ST12), the controller 30 causes the display device 40 to display the ICT setting screen (step ST13). Specifically, the ICT setting screen on which the 5V image is displayed in the hierarchical information display area 41n is displayed. The 5Y image may be displayed instead of the 5V image. That is, instead of the dimension setting screen, the reference point setting screen for the bucket benchmark set function (the screen when the tab "Y" is selected) may be displayed.

Conversely, when it is determined that the predetermined conditions are not satisfied (NO in step ST12), the controller 30 performs the bucket benchmark set function, which is the function originally assigned to the bucket benchmark set button 26S4 (step ST14). In this case, the shovel PS registers, as the origin, the coordinates of the tip of the bucket 6 when the bucket benchmark set button 26S4 is pressed.

Figure 9:
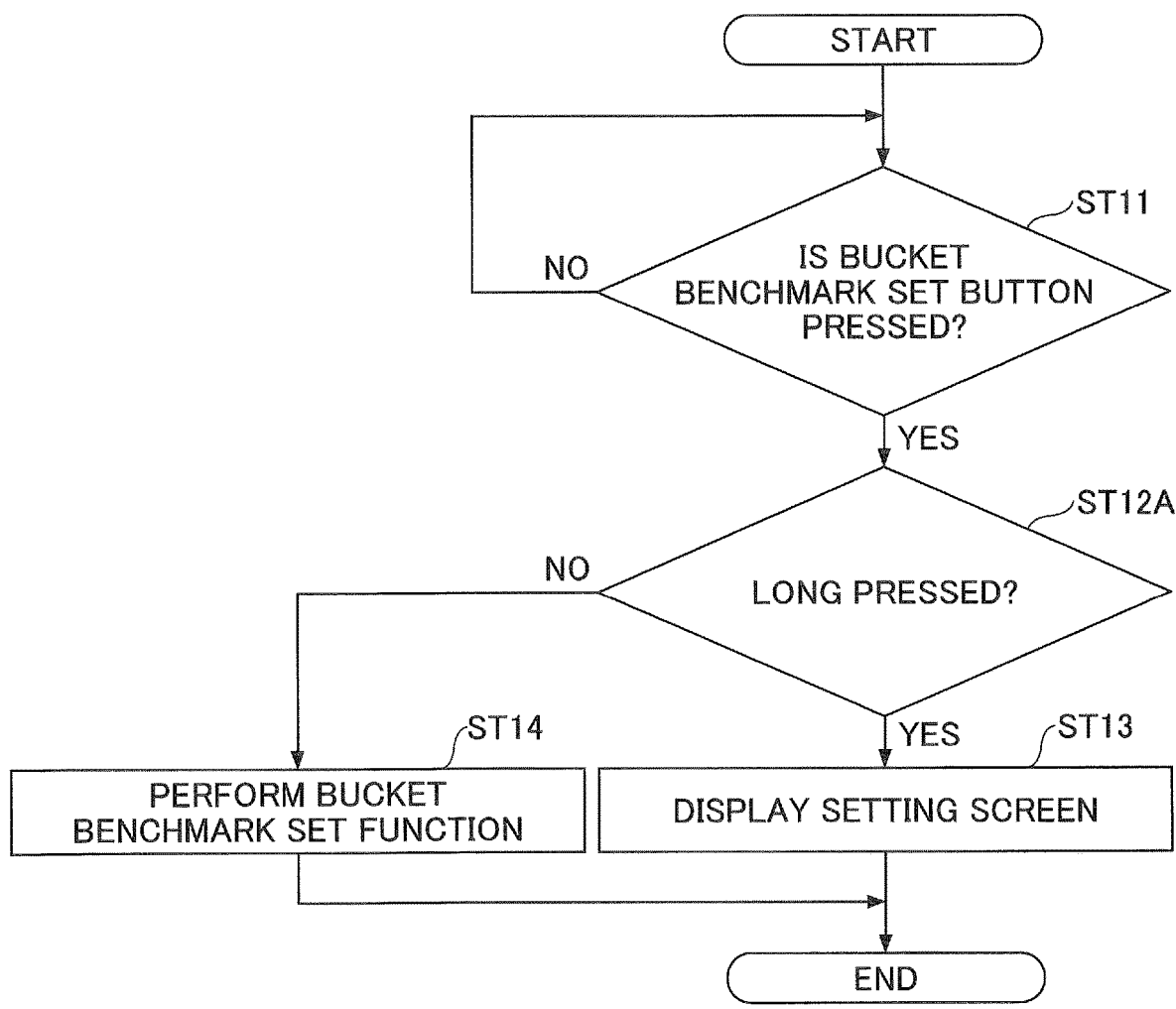
FIG. 9 is a flow chart illustrating another example of the process flow when the bucket benchmark set button is pressed.
Figure 10:
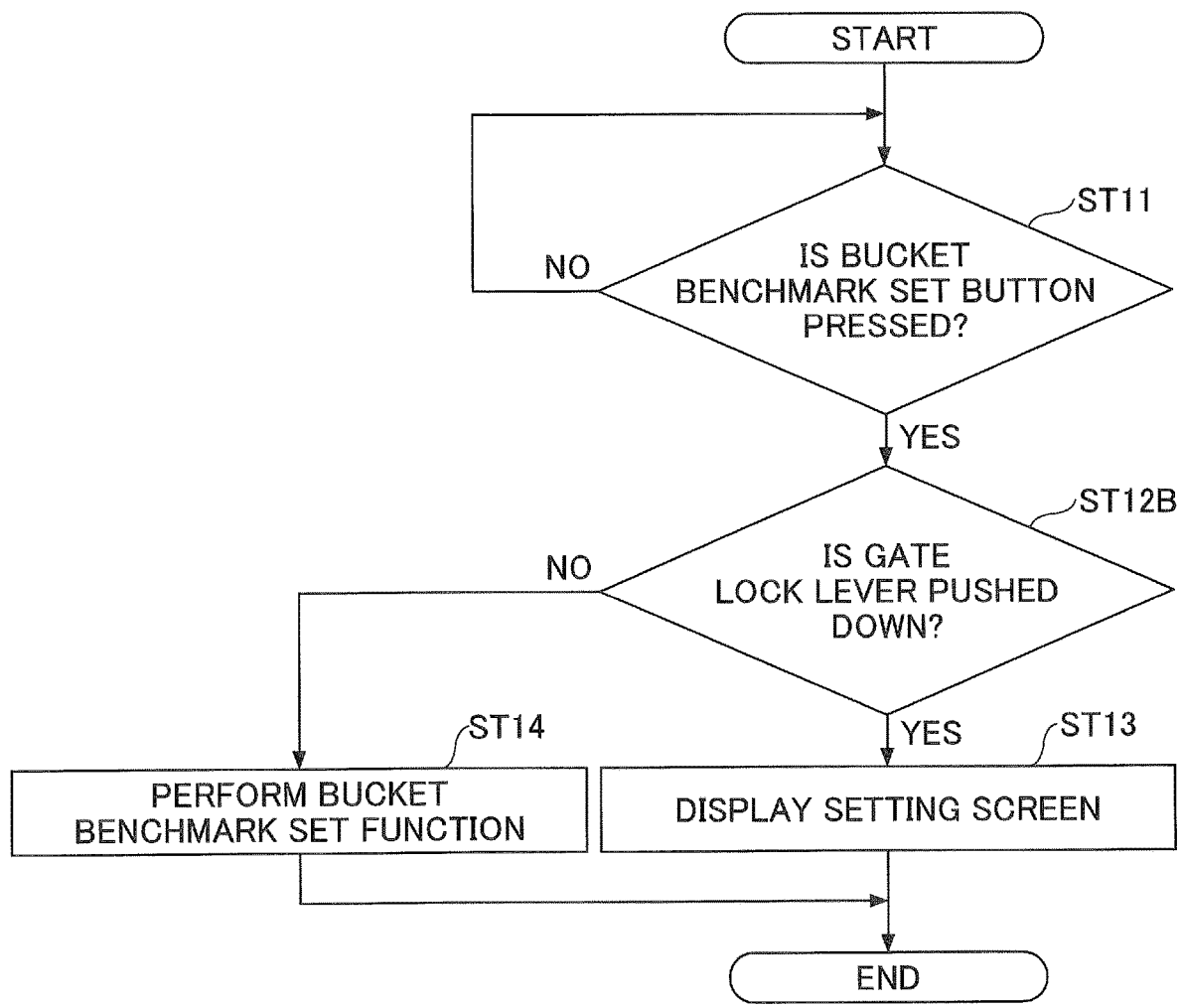
FIG. 10 is a flow chart illustrating yet another example of the process flow when the bucket benchmark set button is pressed.

Processes illustrated in the respective flow charts in FIGS. 9 and 10 are specific examples of the process illustrated in the flow chart of FIG. 8. Specifically, a determination condition in step ST12A of FIG. 9 and a determination condition in step ST12B of FIG. 10 are specific examples of the determination condition in step ST12 of FIG. 8. Therefore, in the following description, explanation of common parts, which are other than the determination condition, is omitted, and a different part, which is the determination condition, will be described in detail.

In the example of FIG. 9, if it is determined that the bucket benchmark set button 26S4 is pressed (YES in step ST11), the controller 30 determines whether or not a long press operation of the bucket benchmark set button 26S4 has been performed (step ST12A). For example, it is determined whether the bucket benchmark set button 26S4 is continuously pressed for a predetermined period of time.

If it is determined that a long press operation of the bucket benchmark set button 26S4 has been performed (YES in step ST12A), the controller 30 displays the ICT setting screen to the display device 40 similarly to the case in which the ICT setting screen display operation is performed (step ST13). This is because the operator's intention to display the ICT setting screen can be presumed. At this time, the controller 30 may display the reference point setting screen (the screen when the tab "Y" is selected) instead of the dimension setting screen (the screen when the tab "V" is selected).

In contrast, when it is determined that the long press operation of the bucket benchmark set button 26S4 is not performed (NO in step ST12A), the controller 30 performs the bucket benchmark set function, which is the function originally assigned to the bucket benchmark set button 26S4 (step ST14).

In the example of FIG. 10, if it is determined that the bucket benchmark set button 26S4 is pressed (YES in step ST11), the controller 30 determines whether or not the gate lock lever 49 is being depressed (step ST12B). That is, it is determined that whether or not an operation of the operation device 26 is disabled, i.e., whether or not it is necessary to display a camera image containing an image of a blind area.

If it is determined that the gate lock lever 49 is being depressed (YES in step ST12B), the controller 30 displays the ICT setting screen on the display device 40 (step ST13) similarly to a case in which the ICT setting screen display operation is performed. This is because it can be determined that no safety problem occurs even if the ICT setting screen is displayed instead of the camera image, because an operation of the attachment is prohibited in this case. At this time, the controller 30 may display the reference point setting screen (the screen when the tab "Y" is selected) instead of the dimension setting screen (the screen when the tab "V" is selected).

In contrast, if it is determined that the gate lock lever 49 is not depressed (NO in step ST12B), the controller 30 performs the bucket benchmark set function, which is the function originally assigned to the bucket benchmark set button 26S4 (step ST14). This is because it is determined that the ICT setting screen should not be displayed instead of the camera image for safety reasons, because an operation of the attachment is allowed. Also, this is because it can be presumed that the operator wishes to execute the bucket benchmark set function, which is the original function.

A function similar to the direction button 42*b* may be assigned to the switch button 26S. For example, a function similar to that performed when the right portion of the direction button 42*b* is pressed may be switchably assigned to the laser setting button 26S1, in addition to the original function of the laser setting button 26S1. Also, a function similar to that performed when the left portion of the direction button 42*b* is pressed may be switchably assigned to the surveying mode button 26S2, in addition to the original function of the surveying mode button 26S2. Further, a function similar to that performed when the upper portion of the direction button 42*b* is pressed may be switchably assigned to the turn benchmark set button 26S5, in addition to the original function of the turn benchmark set button 26S5. Further, a function similar to that performed when the lower portion of the direction button 42*b* is pressed may be switchably assigned to the one-touch idle button 26S6, in addition to the original function of the one-touch idle button 26S6.

Corresponding functions assigned to each of the laser setting button 26S1, the surveying mode button 26S2, the turn benchmark set button 26S5, and the one-touch idle button 26S6 are switched, for example, when a function assigned to the bucket benchmark set button 26S4 is switched. That is, the switching occurs when the above-described predetermined condition is satisfied. Specifically, the switching occurs, for example, in a case in which a long press operation is being performed, and in which the gate lock lever 49 is being depressed. However, the switching may be performed when a condition different from the above-described predetermined condition is satisfied.

As described above, to the switch button 26S serving as the input device 42, a function to switch a screen displayed on the display device 40 to the ICT setting screen may be assigned. In this case, the operator can display the ICT setting screen only by pressing the switch button 26S once.

Also, a function to select one of the setting items displayed on the ICT setting screen and a function to change the value of each of the setting items may be assigned to the switch button 26S. In this case, the operator can change the value of each of the setting items by operating the switch button 26S. Specifically, by operating the laser setting button 26S1, the surveying mode button 26S2, the turn benchmark set button 26S5, and the one-touch idle button 26S6, which function similarly to the direction button 42*b*, one of the setting items can be selected and the value of the selected setting item can be changed.

Further, a function of switching a screen displayed on the display device 40 to the ICT setting screen and a function of the construction support system may be assigned to the switch button 26S in a switchable manner such that these assigned functions can be switched based on a predetermined condition. In this case, the button arrangement can be simplified as compared to a case in which a dedicated button is provided to switch a screen displayed on the display device 40 to the ICT setting screen.

The controller 30 may also switch a screen displayed on the display device 40 to the ICT setting screen when a long press operation of a particular button (bucket benchmark set button 26S4) of the switch button 26S is performed. Alternatively, the controller 30 may switch a screen displayed on the display device 40 to the ICT setting screen when multiple pushbuttons of the switch button 26S are pressed simultaneously. Alternatively, the controller 30 may switch a screen displayed on the display device 40 to the ICT setting screen when a particular button (bucket benchmark set button 26S4) of the switch button 26S is pressed while operations of the operation lever are disabled because the gate lock lever 49 is being depressed. These configurations allow the operator to display the ICT setting screen on the display device 40 very easily.

According to the above-described configuration, by using the switch button 26S, the operator can display the ICT setting screen with a significantly smaller number of pressing of buttons, as compared to a case of performing an operation for displaying the ICT setting screen using the display switching button 42*a* and the direction button 42*b*. Therefore, the operator can easily access the ICT setting screen even if the operator does not understand a hierarchical structure of information.

Figure 11:
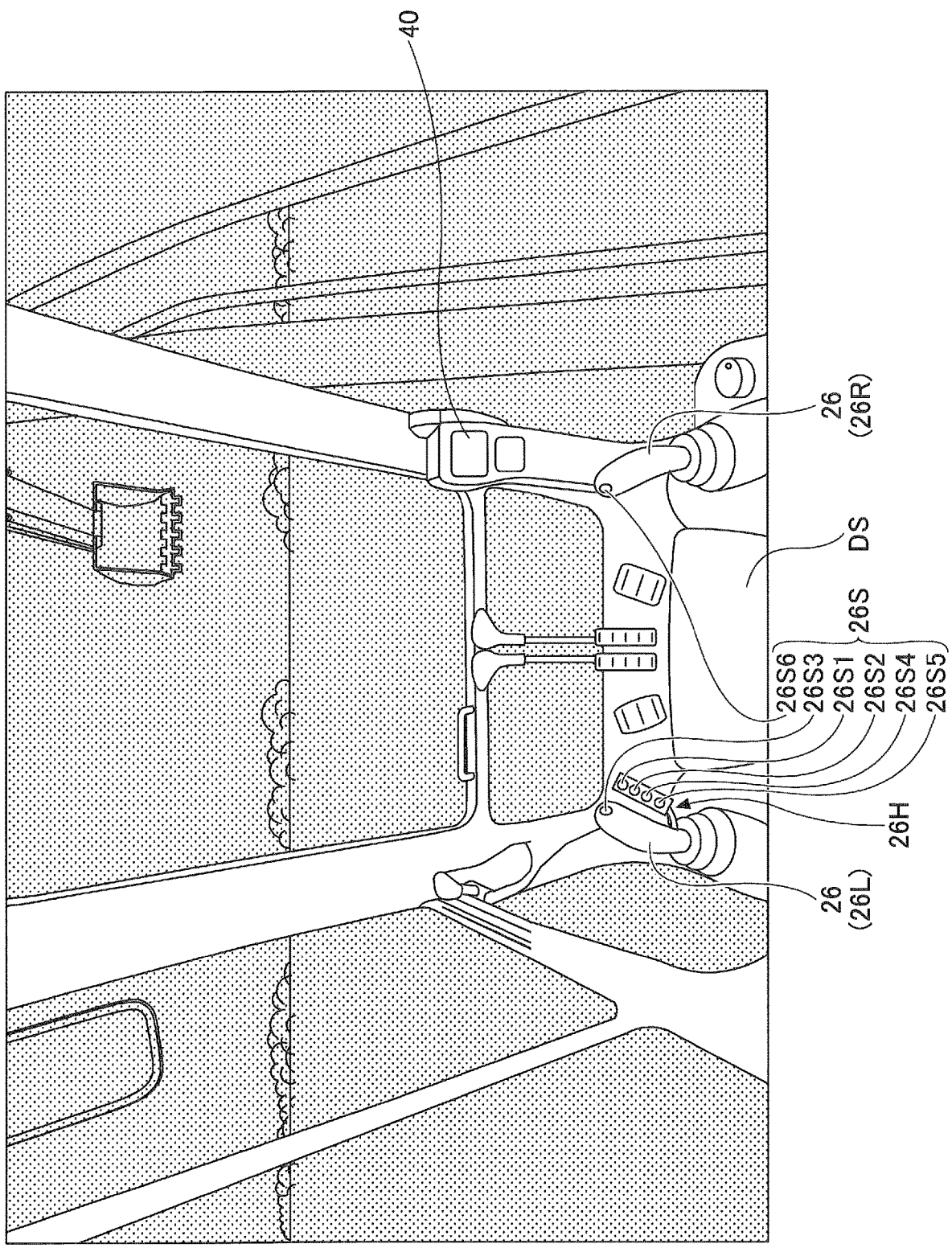
FIG. 11 is a perspective view of the interior of the cab.

Next, another configuration example of the switch button 26S will be described with reference to FIG. 11. FIG. 11 is a perspective view of the interior of the cab 10, which corresponds to FIG. 6.

The switch button 26S of FIG. 11 differs from the switch button 26S of FIG. 6 in that a portion of the switch button 26S of FIG. 11 is provided in a button housing 26H (four buttons are provided in the button housing 26H in the example of FIG. 11). Therefore, descriptions of the common parts are omitted, and different parts will be explained in detail.

The button housing 26H is an extended member branching from the lower end of the left operation lever 26L, and moves with the left operation lever 26L. For example, when the left operation lever 26L is tilted forward, the button housing 26H is tilted forward with the left operation lever 26L. Accordingly, the operator can operate the buttons provided in the button housing 26H with a finger of his/her hand operating the left operation lever, without releasing his/her hand from the left operation lever.

The button housing 26H is provided with the laser setting button 26S1, the surveying mode button 26S2, the bucket benchmark set button 26S4, and the turn benchmark set button 26S5. The horn button 26S3 is provided at the tip of the left operation lever 26L, and the one-touch idle button 26S6 is provided at the tip of the right operation lever 26R.

According to this configuration, the switch button 26S of FIG. 11 has the same effect as the switch button 26S of FIG. 6. Specifically, when each of the six buttons is pressed, the function that is originally assigned to the corresponding button can be performed. In addition, when each of the buttons is pressed in a case in which a predetermined condition is satisfied, a function different from the originally assigned function can be performed. For example, when the one-touch idle button 26S6 is pressed while the gate lock lever 49 is depressed, the ICT setting screen may be displayed on the display device 40 as if the ICT setting screen display operation had been performed. Alternatively, when the laser setting button 26S1, the surveying mode button 26S2, the bucket benchmark set button 26S4, or the turn benchmark set button 26S5 is pressed while the gate lock lever 49 is depressed, the laser setting button 26S1, the surveying mode button 26S2, the bucket benchmark set button 26S4, and the turn benchmark set button 26S5 may react as if the upper, lower, right, and left portions of the direction button 42b were pressed, respectively.

Figure 12:
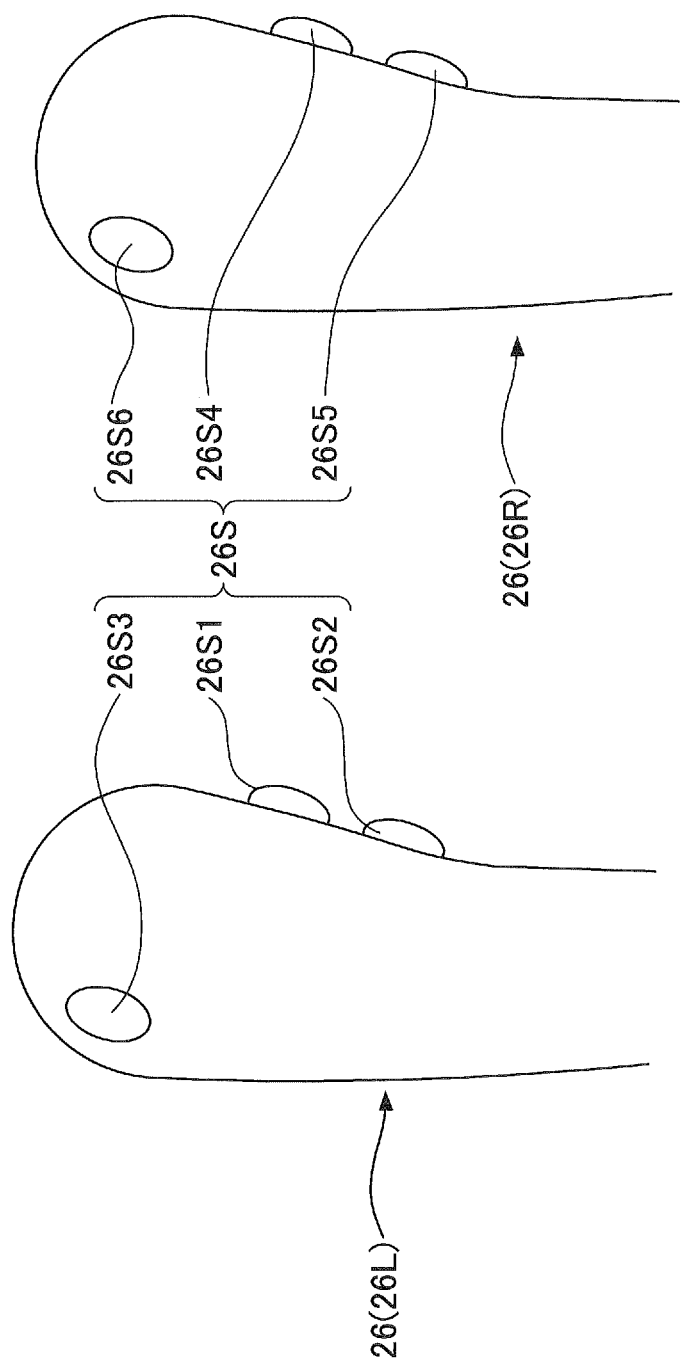
FIG. 12 is a perspective view of a tip of an operation lever.

Next, a yet another configuration example of the switch button 26S will be described with reference to FIG. 12. FIG. 12 is a perspective view of the tip of the operation lever.

The switch button 26S of FIG. 12 differs from the switch button 26S of FIG. 6 in that a portion of the switch button 26S is provided on a back side of the operation lever. Therefore, descriptions of the common parts are omitted, and different parts will be explained in detail.

In the example of FIG. 12, the horn button 26S3 is provided on a front side of the left operation lever 26L so that the operator can operate the horn button 26S3 with the thumb of his/her left hand operating the left operation lever 26L. The laser setting button 26S1 is provided on the back side of the left operation lever 26L so that the operator can operate the laser setting button 26S1 with the index finger of his/her left hand operating the left operation lever 26L. The surveying mode button 26S2 is provided on the back side of the left operation lever 26L so that the operator can operate the surveying mode button 26S2 with the middle finger of his/her left hand operating the left operation lever 26L.

Similarly, the one-touch idle button 26S6 is provided on the front side of the right operation lever 26R so that the operator can operate the one-touch idle button 26S6 with the thumb of his/her right hand operating the right operation lever 26R. The bucket benchmark set button 26S4 is provided on the back of the right operation lever 26R so that the operator can operate the bucket benchmark set button 26S4 with the index finger of his/her right hand operating the right operation lever 26R. The turn benchmark set button 26S5 is provided on the back side of the right operation lever 26R so that the operator can operate the turn benchmark set button 26S5 with the middle finger of his/her right hand operating the right operation lever 26R.

According to the above-described configuration, the switch button 26S of FIG. 12 has the same effect as the switch button 26S of FIG. 6. Specifically, when each of the six buttons is pressed, the function originally assigned to the corresponding button can be performed. In addition, when each button is pressed when a predetermined condition is satisfied, a function different from the originally assigned function can be performed. For example, when the one-touch idle button 26S6 is pressed while the gate lock lever 49 is depressed, the ICT setting screen may be displayed on the display device 40 as if the ICT setting screen display operation had been performed. Alternatively, when the laser setting button 26S1, the surveying mode button 26S2, the bucket benchmark set button 26S4, or the turn benchmark set button 26S5 is pressed while the gate lock lever 49 is depressed, the laser setting button 26S1, the surveying mode button 26S2, the bucket benchmark set button 26S4, and the turn benchmark set button 26S5 may react as if the upper, lower, right, and left portions of the direction button 42b were pressed, respectively.

Figure 13:
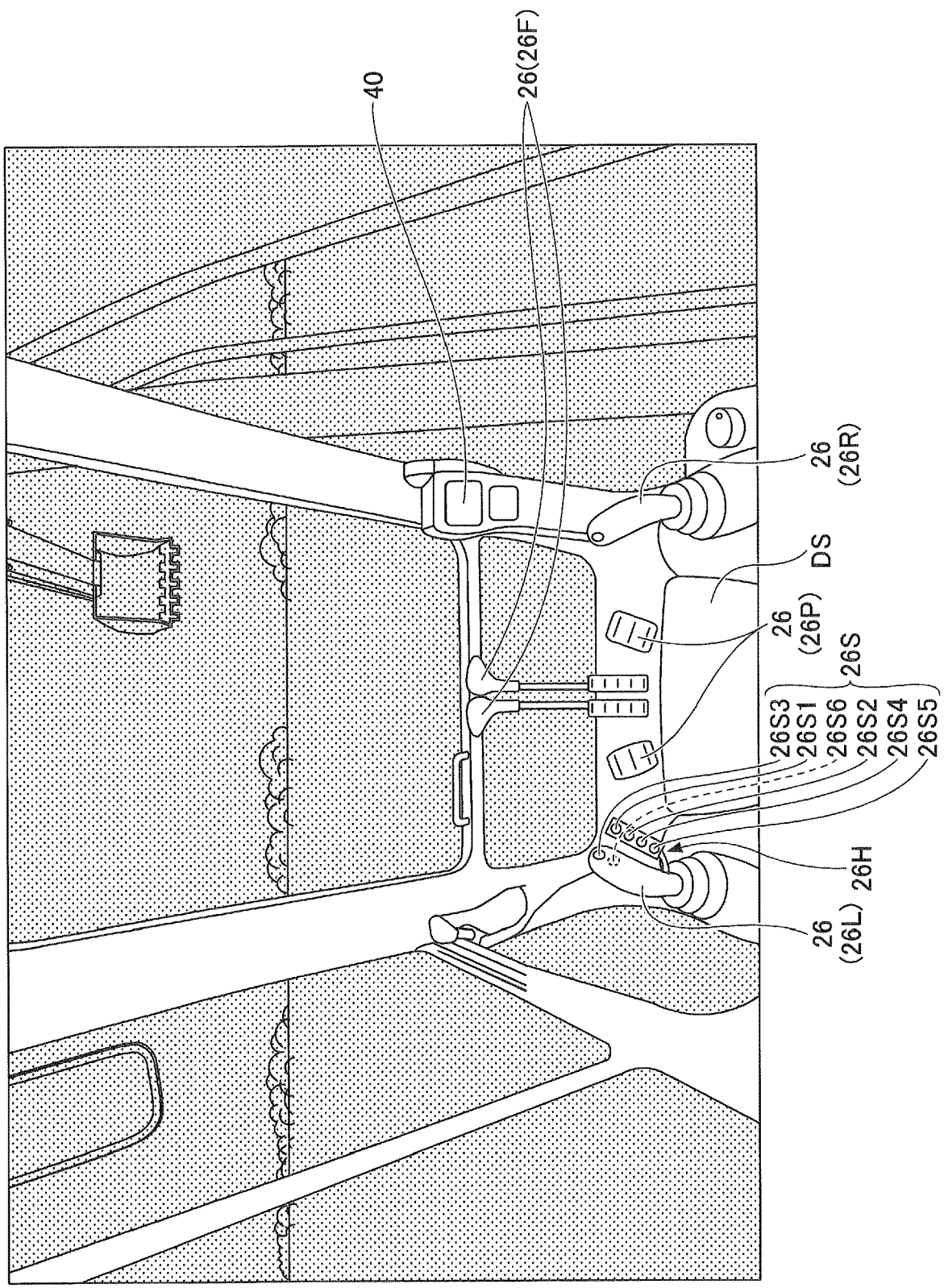
FIG. 13 is a perspective view of the interior of the cab.

Next, yet another example of arrangement of the switch button 26S will be described with reference to FIG. 13. FIG. 13 is a perspective view of the interior of the cab 10, which illustrates a view from the operator's seat DS toward the front of the shovel. In the example of FIG. 13, the switch button 26S includes four buttons on the button housing 26H, one button on the front surface of the tip of the left operation lever 26L, and one button on the back surface of the tip of the left operation lever 26L. The operator can operate the switch button 26S with his/her fingers without releasing his/her hand from the left operation lever 26L.

The button housing 26H is an extended member branching from the lower end of the left operation lever 26L and moves with the left operation lever 26L. For example, when the left operation lever 26L is tilted forward, the button housing 26H is tilted forward with the left operation lever 26L. Accordingly, the operator can operate the buttons provided on the button housing 26H with a finger (thumb) of his/her hand operating the left operation lever 26L, without releasing his/her hand from the left operation lever 26L.

The button housing 26H is provided with the laser setting button 26S1, the surveying mode button 26S2, the bucket benchmark set button 26S4, and the turn benchmark set button 26S5. The horn button 26S3 is provided on the front surface of the tip of the left operation lever 26L and the one-touch idle button 26S6 is provided on the back surface of the tip of the left operation lever 26L. In addition to the original function of the one-touch idle button 26S6, a function to switch a screen displayed on the display device 40 to the ICT setting screen may be switchably assigned to the one-touch idle button 26S6. However, other combinations of buttons may be provided on each of the button housing 26H, the front surface of the tip of the left operation lever 26L, and the back surface of the tip of the left operation lever 26L. Further, other functions may also be assigned to the respective switch buttons 26S.

Figure 14:
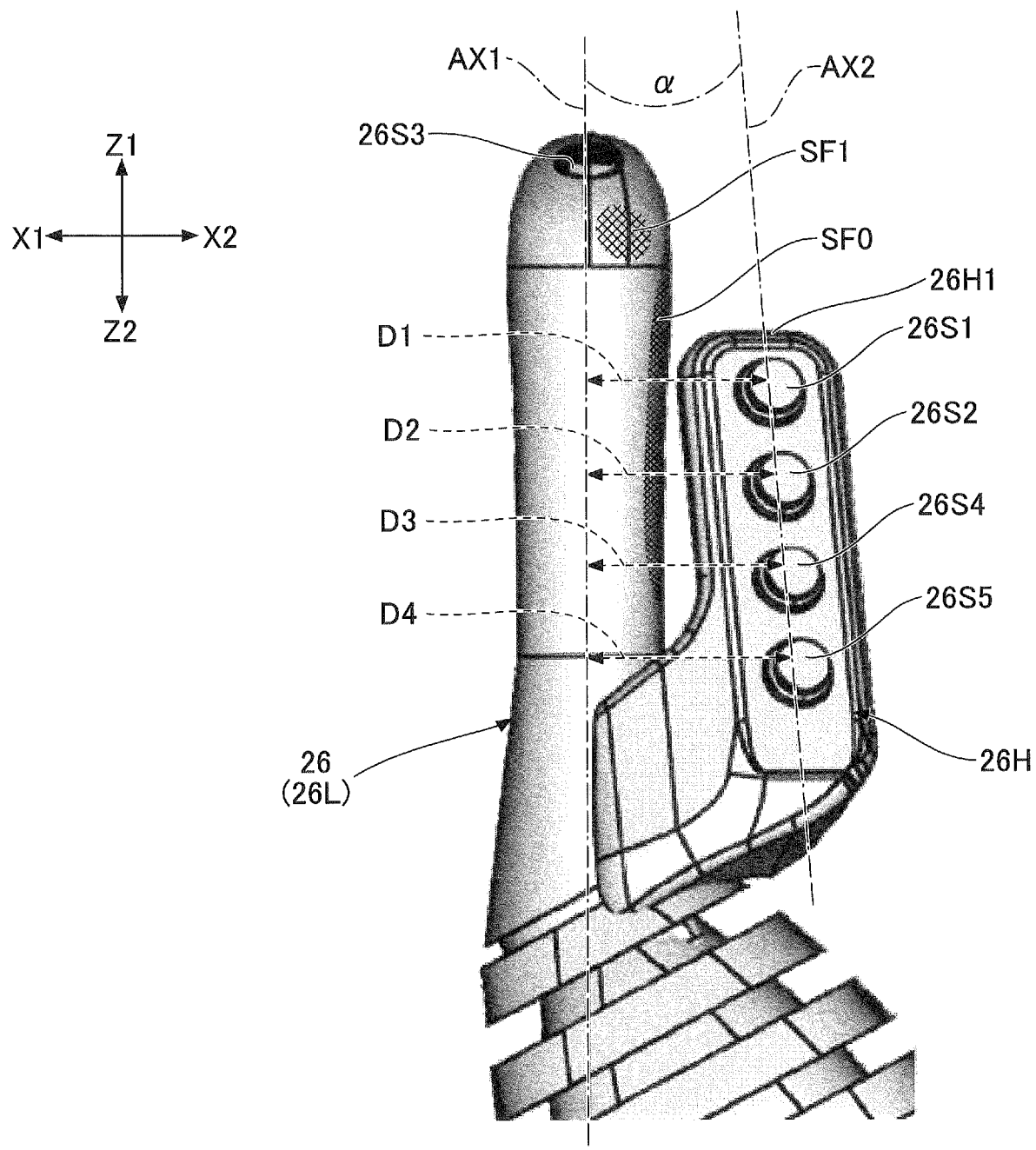
FIG. 14 is a front view of a left operation lever.
Figure 15:
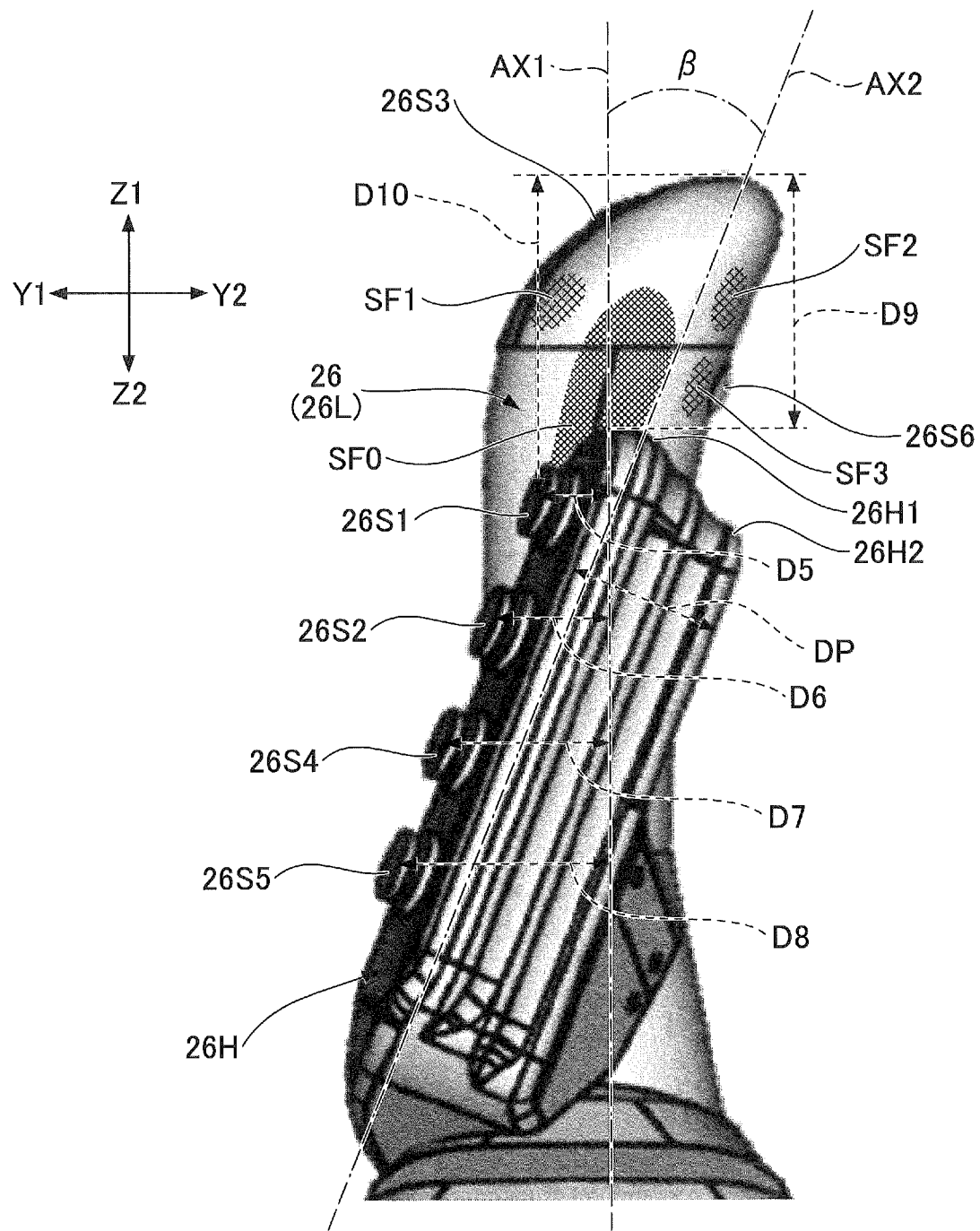
FIG. 15 is a right side view of the left operation lever.
Figure 16:
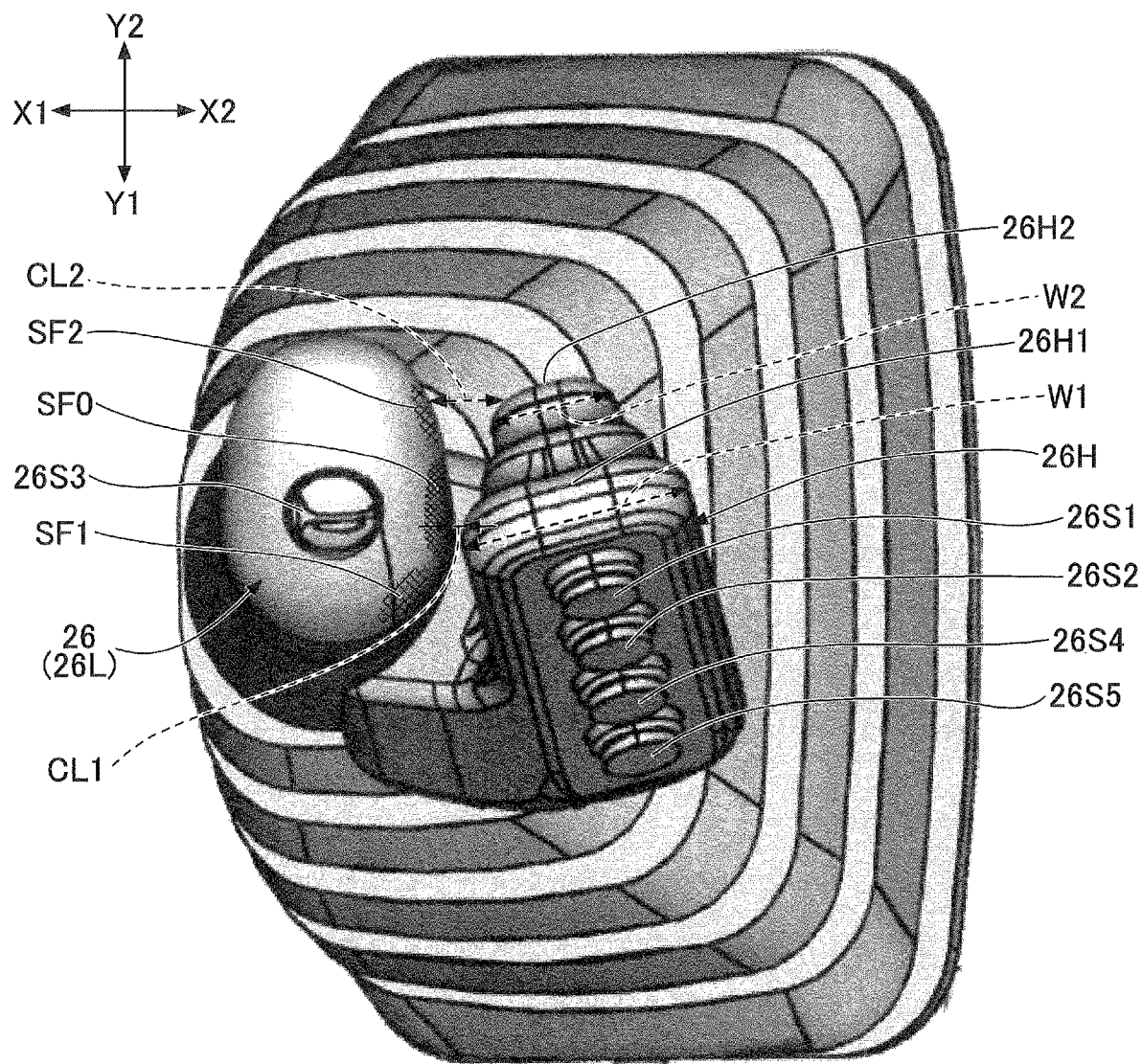
FIG. 16 is a top view of the left operation lever.
Figure 17:
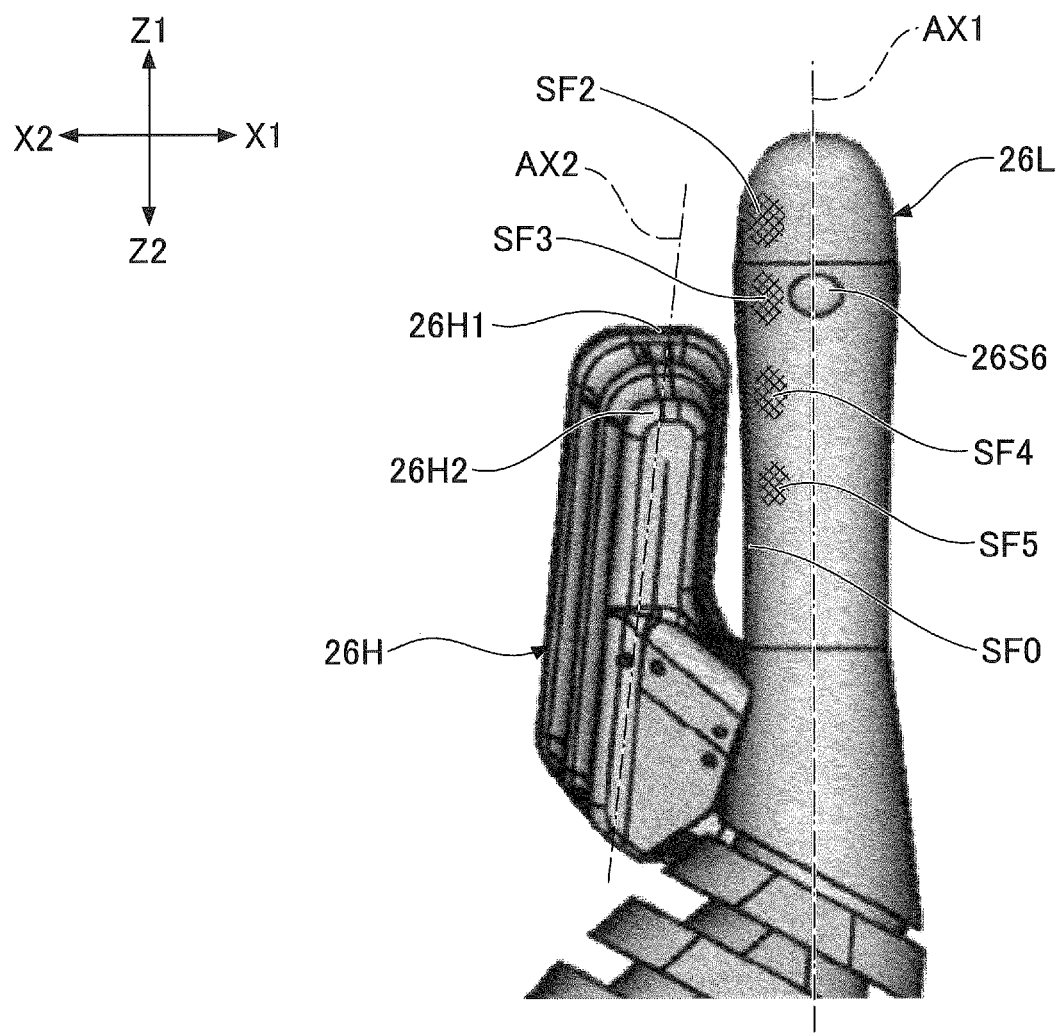
FIG. 17 is a back view of the left operation lever.

Next, a configuration example of the left operation lever 26L will be described with reference to FIGS. 14 to 17. FIG. 14 is a front view of the left operation lever 26L. FIG. 15 is a right side view of the left operation lever 26L. FIG. 16 is a top view of the left operation lever 26L. FIG. 17 is a back view of the left operation lever 26L.

As illustrated in FIG. 14, the button housing 26H is configured to extend from a base portion of the left operation lever 26L, in a longitudinal direction of the left operation lever 26L. In the present embodiment, the button housing 26H is formed of synthetic resin, and is joined to the left operation lever 26L such that the button housing 26H cannot be rotated with respect to the left operation lever 26L. The button housing 26H is arranged such that a central axis AX2 of the button housing 26H is inclined, in a front view, by an angle α with respect to a central axis AX1 of the left operation lever 26L. The angle α is, for example, in the range of 3° to 8°, preferably 5°. Therefore, a distance D1 between the center of the laser setting button 26S1 and the central axis AX1 in the X-axis direction is smaller than a distance D2 between the center of the surveying mode button 26S2 and the central axis AX1 in the X-axis direction. The distance D1 is, for example, in the range of 35 mm to 50 mm, preferably 42 mm. The distance D2 is smaller than a distance D3 between the center of the bucket benchmark set button 26S4 and the central axis AX1 in the X-axis direction. The distance D3 is smaller than a distance D4 between the center of the turn benchmark set button 26S5 and the central axis AX1 in the X-axis direction.

Also, as illustrated in FIG. 15, the button housing 26H is arranged such that its central axis AX2 is inclined, in a right side view, by an angle β with respect to the central axis AX1 of the left operation lever 26L. The angle β is, for example, in the range of 17° to 23°, preferably 20°. Therefore, a distance D5 between the center of the laser setting button 26S1 and the central axis AX1 in the Y-axis direction is smaller than a distance D6 between the center of the surveying mode button 26S2 and the central axis AX1 in the Y-axis direction. The distance D5 is, for example, in the range of 6.8 mm to 8.0 mm, preferably 7.2 mm. Also, the distance D6 is smaller than a distance D7 between the center of the bucket benchmark set button 26S4 and the central axis AX1 in the Y-axis direction. The distance D7 is smaller than a distance D8 between the center of the turn benchmark set button 26S5 and the central axis AX1 in the Y-axis direction.

As illustrated in FIG. 15, the button housing 26H is arranged such that a height of the button housing 26H in the Z-axis direction is shorter by a distance D9 than the left operation lever 26L. The distance D9 is, for example, in the range of 45 mm to 55 mm, preferably 52 mm. In this case, the center of the laser setting button 26S1 is positioned, in the Z-axis direction, at a distance D10 from the tip of the left operation lever 26L. The distance D10 is, for example, in the range of 63 mm to 70 mm, preferably 66 mm. This configuration can prevent the button housing 26H from contacting a part of the operator's body (e.g., a thigh, knee) when the left operation lever 26L is tilted toward the operator's seat DS.

The left operation lever 26L includes: a first surface portion SF1 configured such that a first finger (thumb) of the operator's left hand holding the left operation lever 26L is placed; a second surface portion SF2 configured such that a second finger (index finger) is placed; a third surface portion SF3 configured such that a third finger (middle finger) is placed; a fourth surface portion SF4 configured such that a fourth finger (ring finger) is placed; and a fifth surface portion SF5 configured such that a fifth finger (little finger) is placed. That is, the left operation lever 26L is ergonomically formed so that the left five fingers of the operator's left hand holding the left operation lever 26L touch the corresponding surface portions. The left operation lever 26L also includes an inner surface portion SF0 extending longitudinally along the left operation lever 26L, through between the first surface portion SF1 and each of the second surface portion SF2, the third surface portion SF3, the fourth surface portion SF4 and the fifth surface portion SF5. Also, the button housing 26H is arranged so as to face the inner surface portion SF0. FIGS. 14 to 17 virtually illustrate these surface portions in a cross-hatching pattern.

The first surface portion SF1, the second surface portion SF2 and the third surface portion SF3 are arranged at a position higher than the top of the button housing 26H in the Z-axis direction (at a position to the Z1 side). In contrast, the fourth surface portion SF4 and the fifth surface portion SF5 are arranged at a position lower than the top of the button housing 26H in the Z-axis direction (a position to the Z2 side).

Specifically, the first surface portion SF1 is disposed on the X2 side and the Y1 side relative to the central axis AX1, and is disposed on the Z2 side relative to the horn button 26S3. The second surface portion SF2 is disposed on the X2 side and the Y2 side relative to the central axis AX1, and is disposed on the Z1 side relative to the one-touch idle button 26S6. The third surface portion SF3 is disposed on the X2 side and the Y2 side relative to the central axis AX1, and is disposed on the X2 side relative to the one-touch idle button 26S6. The fourth surface portion SF4 is disposed on the X2 side and the Y2 side relative to the central axis AX1, and is disposed on the X2 side relative to the one-touch idle button 26S6. The fifth surface portion SF5 is disposed on the X2 side and the Y2 side relative to the central axis AX1, and is disposed on the X2 side relative to the one-touch idle button 26S6.

The button housing 26H includes a front portion 26H1 on which the laser setting button 26S1, the surveying mode button 26S2, the bucket benchmark set button 26S4, and the turn benchmark set button 26S5 are disposed, and a back portion 26H2, as illustrated in FIG. 16. A width W1 of the front portion 26H1 is greater than a width W2 of the back portion 26H2. The button housing 26H is also configured such that, in any XY planes, a distance CL1 in the X-axis direction between the front portion 26H1 and the left operation lever 26L is smaller than a distance CL2 in the X-axis direction between the back portion 26H2 and the left operation lever 26L. In addition, the button housing 26H is configured such that both the distance CL1 and the distance CL2 becomes larger toward a lower side (Z2 side). A minimum value of the distance CL1 is, for example, in the range of 5.0 mm to 6.3 mm, preferably 5.7 mm. A minimum value of the distance CL2 is, for example, in the range of 10 mm to 15 mm, preferably 12 mm. A depth DP of the button housing 26H (see FIG. 15) is, for example, in the range of 10 mm to 15 mm, preferably 12 mm.

In the above-described configuration, the laser setting button 26S1, the surveying mode button 26S2, the horn button 26S3, the bucket benchmark set button 26S4, and the turn benchmark set button 26S5 are arranged so that the operator who operates the left operation lever 26L can operate them with a thumb of the operator's left hand. The one-touch idle button 26S6 is arranged so that the operator who operates the left operation lever 26L can operate the button with an index finger or a middle finger of the operator's left hand. Specifically, the laser setting button 26S1, the surveying mode button 26S2, and the horn button 26S3 are arranged so that the operator can operate them with the operator's thumb by rotating his/her thumb around a root of his/her thumb, while the index finger, the middle finger, the ring finger, and the little finger are in contact with the left operation lever 26L. Therefore, the laser setting button 26S1 is arranged, in the Y-axis direction, closer to the central axis AX1 relative to a Y1 side edge of the surface of the left operation lever 26L, as illustrated in FIG. 15. The surveying mode button 26S2 is arranged, in the Y-axis direction, at a position approximately the same as the Y1 side edge of the surface of the left operation lever 26L.

Also, in the above-described configuration, the button housing 26H is arranged such that the five fingers of the operator of the shovel PS do not come into contact when the operator grasps the left operation lever 26L with his/her left hand. Specifically, the button housing 26H is disposed so as to be shorter by the distance D9 than the left operation lever 26L, to avoid contact with each of the thumb, the index finger and the middle finger. Because of this arrangement, the thumb, the index finger, and the middle finger are located above (on the Z1 side) the button housing 26H, and therefore do not touch the button housing 26H. In addition, to avoid contact with each of the ring finger and the little finger, the button housing 26H is arranged to form a space (gap) between the left operation lever 26L and the button housing 26H, such that a size of the space becomes larger toward a lower side (Z2 side). Because of this arrangement, the ring finger and the little finger can be placed in this gap, and therefore do not touch the button housing 26H. Accordingly, the left operation lever 26L can provide the operator with ease of grasping which is almost equal to a case in which the button housing 26H is not provided, and degradation of operability can be prevented as compared to the case in which the button housing 26H is not provided. Also, as described above, the button housing 26H is disposed so as to be shorter by the distance D9 than the left operation lever 26L. Therefore, even when the left operation lever 26L is tilted toward the operator's seat DS, the button housing 26H does not touch a part of the operator's body (e.g., a thigh, a knee). Also in this respect, degradation of operability of the left operation lever 26L can be prevented as compared to the case in which the button housing 26H is not provided.

As described above, the shovel PS according to the embodiments of the present invention includes the lower traveling body 1, the upper turning body 3 rotatably mounted on the lower traveling body 1, the operator's seat DS provided on the upper turning body 3, the left operation lever 26L provided on the left side of the operator's seat DS, and the button housing 26H fitted to the left operation lever 26L at a side closer to the operator's seat DS, so as to be tilted with the left operation lever 26L. Therefore, the shovel PS can cause the operator to operate the switch more easily.

In the above-described embodiments, the button housing 26H is fitted to the left operation lever 26L at the operator's seat DS side. However, the button housing 26H may be fitted to the right operation lever 26R at an operator's seat DS side.

Multiple buttons may be provided on the button housing 26H. In the above-described embodiments, four buttons are provided. However, the number of buttons provided on the button housing 26H may be one, two, three, five or more.

The multiple buttons provided on the button housing 26H are preferably arranged along the longitudinal direction of the left operation lever 26L. In the example of FIG. 14, the multiple buttons are arranged in a line along the central axis AX2 forming an angle α with respect to the central axis AX1 of the left operation lever 26L. However, the multiple buttons may be arranged in two lines, or may be arranged in three or more lines.

A far end (tip) of the left operation lever 26L preferably extends beyond a far end (tip) of the button housing 26H. For example, in the above-described embodiments, as illustrated in FIG. 15, the button housing 26H is disposed, in the Z-axis direction, so as to be shorter by the distance D9 than the left operation lever 26L. This configuration can prevent the button housing 26H from contacting a part of the operator's body (e.g., a thigh, a knee) when the left operation lever 26L is tilted toward the operator's seat DS.

The button housing 26H is preferably disposed at a position apart at a predetermined distance from the left operation lever 26L toward the operator's seat DS. For example, in the above-described embodiments, the front portion 26H1 of the button housing 26H is positioned at least the distance CL1 away from the left operation lever 26L, and the back portion 26H2 of the button housing 26H is positioned at least the distance CL2 (>CL1) away from the left operation lever 26L, as illustrated in FIG. 16. This configuration can provide a space between the left operation lever 26L and the button housing 26H capable of placing the operator's fingers, and can prevent the fingers of the operator's left hand operating the left operation lever 26L from touching the button housing 26H.

The left operation lever 26L preferably includes: the first surface portion SF1 configured such that the first finger (thumb) of the operator holding the left operation lever 26L is placed on the first surface portion SF1; the second surface portion SF2 configured such that the second finger (index finger) is placed on the second surface portion SF2; the third surface portion SF3 configured such that the third finger (middle finger) is placed on the third surface portion SF3; the fourth surface portion SF4 configured such that the fourth finger (ring finger) is placed on the fourth surface portion SF4; and the inner surface portion SF0 extending longitudinally along the left operation lever 26L, through between the first surface portion SF1 and each of the second surface portion SF2, the third surface portion SF3, and the fourth surface portion SF4. The button housing 26H is preferably arranged so as to face the inner surface portion SF0. The second surface portion SF2 and the third surface portion SF3 are preferably disposed on a portion of the left operation lever 26L that extends beyond the far end (tip) of the button housing 26H. Also, the button housing 26H preferably includes the front portion 26H1 on which the button is disposed, and the back portion 26H2 disposed on the opposite side of the front portion 26H1. The back portion 26H2 is disposed at a position farther from the left operation lever 26L than the front portion 26H1. This configuration can prevent the fingers of the operator's left hand operating the left operation lever 26L from touching the button housing 26H.

The preferred embodiments of the present invention have been described in detail. However, the present invention is not limited to the embodiments described above. Various modifications, substitutions, and the like may be applied without departing from the scope of the present invention. Also, the features described separately can be combined unless technical contradiction occurs.

For example, in the above-described embodiments, the switch button 26S serving as a shortcut button that causes the ICT setting screen to be displayed is provided on the operation lever as a dual-function button for selectively performing two functions. However, the present invention is not limited to this configuration. For example, a shortcut button that causes the ICT setting screen to be displayed may be provided independently of the operation lever. For example, the shortcut button may be provided on the switch panel. The shortcut button for displaying the ICT setting screen may be a dedicated button to which only the shortcut function is assigned.

The display device 40 may also include two display devices. In this case, one of the two display devices may be a dedicated monitor of the construction support system utilizing ICT, such as a machine guidance system, a machine control system, or the like.

In the above-described embodiments, the controller 30 displays the hierarchical information display area 41n instead of the camera image display area 41m. However, the controller 30 may display the hierarchical information display area 41n simultaneously with the camera image display area 41m.

Also, in the above-described embodiments, a pushbutton switch is disposed on the button housing 26H. However, other types of switches may be disposed, such as a toggle switch, a rocker switch, and the like. Also, a waterproof switch, such as a membrane switch, may be disposed.

What is claimed is:
1. A shovel comprising:
a lower traveling body;
an upper turning body rotatably mounted on the lower traveling body;
an attachment attached to the upper turning body;
an operator's compartment provided to the upper turning body;
a display device provided in the operator's compartment;
an operation unit provided in the operator's compartment; and
an input device provided in the operator's compartment,
wherein the display device is configured to display a setting screen for a construction support system using information and communication technology, the setting screen for the construction support system includes a setting screen that enables a setting of a relative relationship between a work portion of the attachment and a target surface,
a function to switch a screen displayed on the display device to the setting screen that enables the setting of the relative relationship between the work portion of the attachment and the target surface is assigned to the input device,
a plurality of screens are displayed on the display device in a manner in which one of the plurality of screens displayed on the display device is sequentially switched to another one of the plurality of screens in accordance with a given order, each time the operation unit is operated,
at least one of the plurality of screens is the setting screen that enables the setting of the relative relationship between the work portion of the attachment and the target surface, and
the setting screen that enables the setting of the relative relationship between the work portion of the attachment and the target surface is displayed on the display device in response to an operation of the input device, regardless of the given order.

2. The shovel according to claim 1, wherein the input device is attached to an operation lever provided in the operator's compartment, the input device being operable by a finger of a hand operating the operation lever.

3. The shovel according to claim 1, wherein the input device is provided independently of an operation lever provided in the operator's compartment.

4. The shovel according to claim 1, wherein a function to select one of a plurality of setting items displayed on the setting screen that enables the setting of the relative relationship between the work portion of the attachment and the target surface and a function to change a value of each of the plurality of setting items are assigned to the input device.

5. The shovel according to claim 1, wherein a function of the construction support system and the function to switch the screen displayed on the display device to the setting screen that enables the setting of the relative relationship between the work portion of the attachment and the target surface are assigned to the input device in a switchable manner, such that a function assigned to the input device can be switched between the function of the construction support system and the function to switch the screen displayed on the display device to the setting screen that enables the setting of the relative relationship between the work portion of the attachment and the target surface, based on a predetermined condition.

6. The shovel according to claim 5, wherein the input device is a pushbutton, and the screen displayed on the display device is switched to the setting screen that enables the setting of the relative relationship between the work portion of the attachment and the target surface in a case in which a long press operation of the pushbutton is performed.

7. The shovel according to claim 5, wherein the input device includes a plurality of pushbuttons, and the screen displayed on the display device is switched to the setting screen that enables the setting of the relative relationship between the work portion of the attachment and the target surface in a case in which the plurality of pushbuttons are pressed simultaneously.

8. The shovel according to claim 5, wherein, in a case in which a gate lock lever is depressed, the function to switch the screen displayed on the display device to the setting screen that enables the setting of the relative relationship between the work portion of the attachment and the target surface is assigned to the input device.

9. The shovel according to claim 1, further comprising: an operation lever provided at a side of an operator's seat,
wherein the input device is provided on a button housing fitted to the operation lever, the button housing being disposed at a side closer to the operator's seat so as to be tilted with the operation lever.

10. The shovel according to claim 9, wherein a plurality of buttons are provided on the button housing.

11. The shovel according to claim 10, wherein the plurality of buttons are arranged along a longitudinal direction of the operation lever.

12. The shovel according to claim 9, wherein a far end of the operation lever extends beyond a far end of the button housing.

13. The shovel according to claim 9, wherein the button housing is disposed at a position apart at a predetermined distance from the operation lever toward a direction of the operator's seat.

14. The shovel according to claim 9, wherein
the operation lever includes
a first surface portion configured such that a first finger of an operator holding the operation lever is placed on the first surface portion;
a second surface portion configured such that a second finger of the operator holding the operation lever is placed on the second surface portion;
a third surface portion configured such that a third finger of the operator holding the operation lever is placed on the third surface portion;
a fourth surface portion configured such that a fourth finger of the operator holding the operation lever is placed on the fourth surface portion; and
an inner surface portion extending longitudinally along the operation lever, through between the first surface portion and each of the second surface portion, the third surface portion, and the fourth surface portion; and
the button housing is arranged so as to face the inner surface portion.

15. The shovel according to claim 14, wherein the second surface portion and the third surface portion are disposed on a portion of the operation lever that extends beyond a far end of the button housing.

16. The shovel according to claim 9, wherein the button housing includes a front portion on which a button is disposed, and a back portion disposed on an opposite side of the front portion, the back portion being disposed at a position far from the operation lever than the front portion.

17. The shovel according to claim 1, further comprising:
an orientation sensor configured to detect an orientation of the attachment, to derive a position of the work portion of the attachment.

* * * * *